United States Patent
Lobello

(10) Patent No.: US 11,324,314 B2
(45) Date of Patent: May 10, 2022

(54) CABINET APPARATUS

(71) Applicant: Kohler Co., Kohler, WI (US)

(72) Inventor: Agostino Lobello, Downers Grove, IL (US)

(73) Assignee: KOHLER CO.

( * ) Notice: Subject to any disclaimer, the term of this patent is extended or adjusted under 35 U.S.C. 154(b) by 25 days.

(21) Appl. No.: 16/800,831

(22) Filed: Feb. 25, 2020

(65) Prior Publication Data

US 2021/0259413 A1 Aug. 26, 2021

Related U.S. Application Data

(60) Provisional application No. 62/979,492, filed on Feb. 21, 2020.

(51) Int. Cl.
*A47B 81/06* (2006.01)
*F16B 2/12* (2006.01)

(52) U.S. Cl.
CPC .......... *A47B 81/064* (2013.01); *A47B 81/065* (2013.01); *F16B 2/12* (2013.01)

(58) Field of Classification Search
CPC ..... A47B 81/064; A47B 81/065; A47B 67/00; A47B 67/02; F16B 2/12; A45D 42/14; A45D 42/16; A45D 42/18; A45D 42/20
(Continued)

(56) References Cited

U.S. PATENT DOCUMENTS 1,932,697 A * 10/1933 Jankovic .................. B60R 1/04
248/478
2,199,731 A 5/1940 Pryne
(Continued)

FOREIGN PATENT DOCUMENTS

EP 3199857 A1 8/2017
EP 3203351 A1 8/2017
(Continued)

OTHER PUBLICATIONS

Amazon website, https://www.amazon.com/dp/B07SDFFHSW/ref=sspa_dk_detail_1?psc=1&pd_rd_i=B07SDFFHSW&pd_rd_w=xYxV5&pf_rd_p=45a72588-80f7-4414-9851-786f6c16d42b&pd_rd_wg=fQhFT&pf_rd_r=KZFNPDWVT7BGCJX2A8FQ&pd_rd_r=162606e6-4c83-4bc8-b4af-0cc4d2433ff3&spLa=ZW5jcnlwdGVkUXVhbGlmaWVyPUEyN0k1WDRFS1pYOFU5JmVuY3J5cHRlZElkPUEwMjUyMDEyMzc2OTRKTTA4VUpKNiZlbmNyeXB0ZWRBZElkPUEwNjE4Njk0MlFDVlY0SkZLMENaUiZ3aWRnZXROYW1lPXNwX2RldGFpbCZhY3Rpb249Y2xpY2tSZWRpcmVjdCZkb05vdExvZ0NsaWNrPXRydWU=, retrieved Feb. 25, 2020, pp. 1-9.
(Continued)

*Primary Examiner* — Daniel J Troy
*Assistant Examiner* — Timothy M Ayres
(74) *Attorney, Agent, or Firm* — The Belles Group, P.C.

(57) ABSTRACT

A cabinet apparatus including a housing having a cavity, a door that closes the cavity, and a support assembly that is coupled to the cabinet assembly. The support assembly may be movable in accordance with several different types of movement. For example, the support assembly may be movable upwardly and downwardly relative to the cabinet assembly along a vertical axis that is parallel to the longitudinal axis of the cabinet assembly. The support assembly may be rotatable about a first rotational axis to move a holding component of the support assembly between a stowed position in which the holding component is stored away and a deployed position in which the holding component protrudes from a periphery of the cabinet assembly. The support assembly may be rotatable about a second rotational axis to adjust an angle at which the holding component protrudes from the periphery of the cabinet assembly.

20 Claims, 15 Drawing Sheets

(58) Field of Classification Search
USPC .................................................. 312/224–226
See application file for complete search history.

(56) References Cited

U.S. PATENT DOCUMENTS

| | | | | |
|---|---|---|---|---|
| 2,239,487 | A * | 4/1941 | Fulton | A47B 67/02 |
| | | | | 248/485 |
| 3,315,932 | A * | 4/1967 | Chandler | A47G 1/00 |
| | | | | 248/231.41 |
| 3,392,950 | A * | 7/1968 | Pierce | A47G 1/24 |
| | | | | 248/279.1 |
| 5,164,861 | A | 11/1992 | Katz | |
| 6,698,906 | B1 * | 3/2004 | Tally | B25B 9/00 |
| | | | | 359/864 |
| 6,840,639 | B2 * | 1/2005 | Zadro | A45D 42/16 |
| | | | | 359/855 |
| 7,040,699 | B2 | 5/2006 | Curran et al. | |
| 7,546,996 | B2 | 6/2009 | Somji | |
| 8,024,839 | B2 * | 9/2011 | Lewis, II | E05D 11/105 |
| | | | | 16/266 |
| 8,424,982 | B1 | 4/2013 | Schwartz | |
| 9,074,722 | B1 | 7/2015 | Phillips | |
| 9,211,004 | B2 | 12/2015 | Diemel, Jr. et al. | |
| 9,278,648 | B2 | 3/2016 | Ackeret et al. | |
| 9,282,841 | B1 | 3/2016 | Blair | |
| 9,441,782 | B2 | 9/2016 | Funk et al. | |
| 9,452,839 | B2 | 9/2016 | Chatrenet et al. | |
| 9,527,456 | B2 | 12/2016 | Ackeret et al. | |
| 9,732,901 | B2 | 8/2017 | Satterfield | |
| 9,797,543 | B2 | 10/2017 | Lin | |
| 10,208,891 | B2 | 2/2019 | Myerchin | |
| 10,322,764 | B2 * | 6/2019 | Thomas | B62J 9/21 |
| 10,343,778 | B2 | 7/2019 | Peuziat | |
| 10,473,887 | B2 * | 11/2019 | Beyda | A45D 42/08 |
| 10,582,769 | B2 * | 3/2020 | Stanley, Jr. | A47B 57/20 |
| 2005/0167563 | A1 | 8/2005 | Delaney | |
| 2007/0090638 | A1 | 4/2007 | Severi Rivera | |
| 2011/0073743 | A1 | 3/2011 | Shamie | |
| 2013/0134284 | A1 | 5/2013 | Hu et al. | |
| 2014/0319083 | A1 * | 10/2014 | Stark | A47K 3/281 |
| | | | | 211/26 |
| 2016/0273703 | A1 | 9/2016 | Li | |
| 2017/0071316 | A1 * | 3/2017 | Perez | A45D 42/10 |
| 2017/0181541 | A1 | 6/2017 | Stanley, Jr. et al. | |
| 2018/0087715 | A1 | 3/2018 | White | |
| 2019/0003638 | A1 | 1/2019 | Bertelle | |
| 2019/0104869 | A1 * | 4/2019 | Mohr | A47G 1/1613 |

FOREIGN PATENT DOCUMENTS

| | | |
|---|---|---|
| GB | 903276 A | 8/1962 |
| WO | WO2017/041914 A1 | 3/2017 |

OTHER PUBLICATIONS

Amazon website, https://www.amazon.com/CTA-Digital-PAD-KMSB-Multi-Flex-Tablet/dp/B07CD5V5B7/ref=pd_sbs_147_5/134-9119746-6472138?_encoding=UTF8&pd_rd_i=B07CD5V5B7&pd_rd_r=162606e6-4c83-4bc8-b4af-0cc4d2433ff3&pd_rd_w=Iq3dQ&pd_rd_wg=fQhFT&pf_rd_p=bdd201df-734f-454e-883c-73b0d8ccd4c3&pf_rd_r=KZFNPDWVT7BGCJX2A8FQ&psc=1&refRID=KZFNPDWVT7BGCJX2A8FQ, retrieved Feb. 25, 2020, pp. 1-7.

International Search Report and Written Opinion issued in corresponding PCT Application No. PCT/US2021/018322, dated May 5, 2021, pp. 1-16.

* cited by examiner

CABINET APPARATUS

CROSS-REFERENCE TO RELATED APPLICATIONS

The present application claims priority to U.S. Patent Application Ser. No. 62/979,492, filed Feb. 21, 2020, the entirety of which is incorporated herein by reference.

BACKGROUND

Cabinets are used throughout the home and in certain office environments in order to store items out of sight but in an easily accessible location. For example, medicine cabinets are typically hung in a bathroom and include a mirrored door. People typically store items related to personal hygiene in medicine cabinets, such as deodorant, toothpaste, toothbrushes, hairbrushes, and medication. Some users have a desire to multi-task while performing various activities in the bathroom. For example, users may wish to watch a video on an electronic device to pass the time, take in information, or enhance their experience during a particular activity such as toothbrushing. Users may alternatively desire to read an article on an electronic device or in print while performing such activities. However, there is currently no way to support an electronic device, print article, or the like in such a way that it can be readily viewed by the user, will not be subjected to water damage, and can be easily stowed away when not in use. Thus, a need exists for improvements in the cabinet space that provide a user with a place to support certain articles off the countertop and within the user's field of view during personal hygiene activities.

BRIEF SUMMARY

The present invention may be directed to a cabinet apparatus including a housing having a cavity, a door that closes a front opening of the cavity, and a support assembly that is coupled to the cabinet assembly. The support assembly may be movable in accordance with several different types of movement. For example, the support assembly may be movable upwardly and downwardly relative to the cabinet assembly along a vertical axis that is parallel to the longitudinal axis of the cabinet assembly. The support assembly may be rotatable about a first rotational axis to move a holding component of the support assembly between a stowed position in which the holding component is stored away and a deployed position in which the holding component protrudes from a periphery of the cabinet assembly. The support assembly may be rotatable about a second rotational axis to adjust an angle at which the holding component protrudes from the periphery of the cabinet assembly.

In one aspect, the invention may be a cabinet apparatus comprising: a cabinet assembly having a longitudinal axis and comprising: a housing comprising a cavity having a front opening; and a door coupled to the housing to close the front opening of the cavity; and a support assembly coupled to the cabinet assembly and movable vertically relative to the cabinet assembly in opposing directions parallel to the longitudinal axis, the support assembly comprising a holding component configured to hold an article for viewing by a user, the holding component being rotatable relative to the cabinet assembly about a first rotational axis between: (1) a stowed position whereby the door can be closed and the holding component is located inside the cavity of the housing; and (2) a deployed position whereby the door can be closed and the holding component is located outside the cavity of the housing.

In another aspect, the invention may be a cabinet apparatus comprising: a cabinet assembly having a longitudinal axis and comprising: a housing comprising a cavity having a front opening; and a door coupled to the housing to close the front opening of the cavity; a support assembly coupled to the cabinet assembly, the support assembly comprising a holding component configured to hold an article for viewing by a user, the holding component being rotatable relative to the cabinet assembly about: (1) a first rotational axis to move the holding component between a stowed position whereby the holding component does not protrude from a periphery of the cabinet assembly and a deployed position whereby the holding component protrudes from the periphery of the cabinet assembly; and (2) a second rotational axis to adjust an angle at which the holding component extends from the cabinet assembly when the holding component is in the deployed position; and wherein the first and second rotational axes are spaced apart from one another and parallel to the longitudinal axis of the cabinet assembly.

In yet another aspect, the invention may be a cabinet apparatus comprising: a cabinet assembly having a longitudinal axis: and a support assembly comprising a holding component configured to detachably hold an article for viewing by a user, the support assembly movably coupled to the cabinet assembly so that the support assembly can move relative to the cabinet assembly in accordance with a plurality of types of movement comprising: (1) upwardly and downwardly along a vertical axis that is parallel to the longitudinal axis of the cabinet assembly to adjust an elevation of the support assembly relative to the cabinet assembly; (2) rotationally about a first rotational axis that is parallel to the longitudinal axis of the cabinet assembly to move the holding component of the support assembly between a stowed position in which no portion of the support assembly protrudes from a periphery of the cabinet assembly and a deployed position in which the holding component protrudes from the periphery of the cabinet assembly; and (3) rotationally about a second rotational axis that is parallel to the longitudinal axis of the cabinet assembly to adjust an angle at which the holding component extends from the cabinet assembly when in the deployed position.

In a further aspect, the invention may be a cabinet apparatus comprising: a cabinet assembly comprising: a housing; and a door coupled to the housing, the door having an inner surface that faces the housing when the door is closed; and a support assembly coupled to the inner surface of the door of the cabinet assembly, the support assembly comprising a holding component configured to hold an article for viewing by a user, the holding component being: (1) rotatable about a first rotational axis to move the holding component between a stowed position whereby the holding component is adjacent to the inner surface of the door and a deployed position whereby the holding component protrudes from a periphery of the door; and (2) rotatable about a second rotational axis to adjust an angle at which the holding component protrudes from the periphery of the door when the holding component is in the deployed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
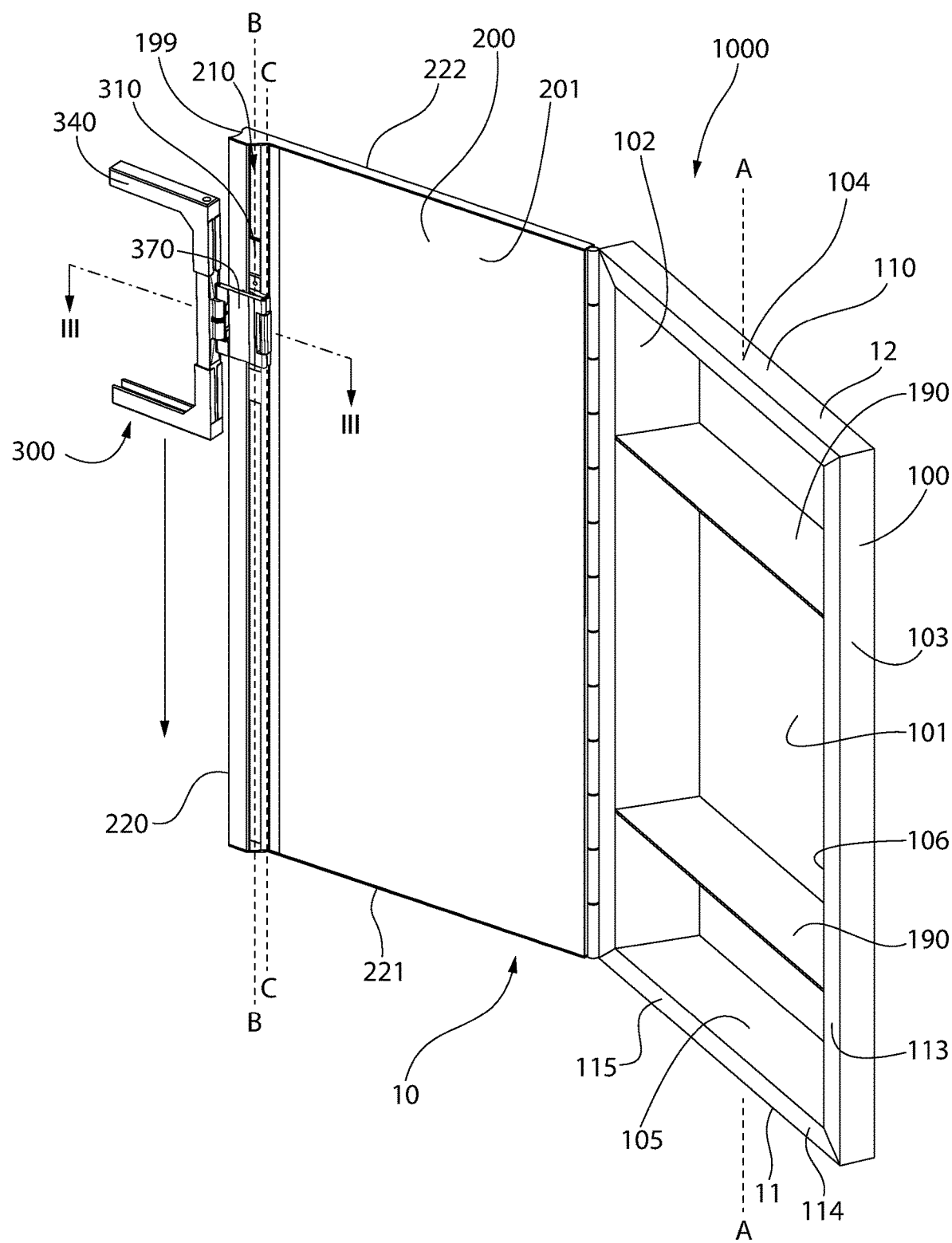
FIG. 1 is a perspective view of a cabinet apparatus with a door of a cabinet assembly in an open state and a holding component of a support assembly in a deployed position.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, a cabinet apparatus 1000 is illustrated in accordance with an embodiment of the present invention. The cabinet apparatus 1000 comprises a cabinet assembly 10 and a support assembly 300 that is coupled to the cabinet assembly 10. The cabinet assembly 10 comprises a longitudinal axis A-A such that the cabinet assembly 10 extends from a bottom end 11 to a top end 12 along the longitudinal axis A-A. The cabinet assembly 10 generally comprises a housing 100 and a door 200 that is pivotably coupled to the housing 100 so that the door 200 can be alternated between an open state (shown in FIG. 1) and a closed state (shown in FIG. 7A). The housing 100 comprises a cavity 110 within which various items may be stored. In the exemplified embodiment, the support assembly 300 is coupled to the housing 100 and configured for a plurality of different types of movement relative to the housing 100 to optimize a viewing height and viewing angle of an article being held or supported by the support assembly 300, the details of which will be described throughout this disclosure.

The cabinet assembly 10 may be a medicine cabinet in some embodiments, although the invention is not to be so limited in all embodiments. Thus, the cabinet assembly 10 could be a kitchen cabinet, an office cabinet, or any other type of cabinet that may benefit from the inclusion of the support assembly 300 which is used to hold and/or support an external device or article, such as those described in greater detail herein below. The disclosure set forth herein could also be applicable to a bookshelf, a desk, or other pieces of furniture to which it may be desirable to attach the support assembly 300.

The cabinet assembly 10 may be attached to a support surface, such as a wall in a bathroom or other room in a home, using a flush mount or recess mount technique. In a recess mounting, much of the housing 100 is recessed within the wall while a flange at the front of the housing 100 abuts against the surface of the wall. In a flush mounting, the entirety of the cabinet assembly 10 is positioned on an outer surface of the wall and none of the housing 100 is recessed. These are conventional techniques for mounting a cabinet, and particularly a medicine cabinet, to a wall in a home and therefore no further details related to the mounting techniques will be provided herein.

The housing 100 may be formed from any material that is commonly or conventionally used to manufacture cabinets. Thus, for example, the housing 100 may be formed from metal, plastic, or wood in various different embodiments. The housing 100 may comprise a rear wall 101 and a plurality of sidewalls extending from the rear wall 101 to a front opening 106 of the cavity 110. In the exemplified embodiment, the plurality of sidewalls comprises a left sidewall 102, a right sidewall 103, a top sidewall 104, and a bottom sidewall 105. The left, right, top, and bottom sidewalls 102-105 collectively define the cavity 110 of the housing 100. In the exemplified embodiment, the housing 100 and also the cavity 110 have rectangular or square shapes. However, different numbers of sidewalls may be used in other embodiments, which will in turn alter the shape of the cavity 110. For example, if there are three sidewalls the cavity 110 may have a triangular shape, if there are six sidewalls the cavity may have a hexagonal shape, etc.

The plurality of sidewalls 102-105 each extend from the front surface 112 of the rear wall 101 to the front opening 106 of the cavity 110. More specifically, each of the plurality of sidewalls 102-105 extends from the rear wall 101 to a distal end or terminal end 113, with the distal end 113 surrounding the front opening 106 of the cavity 110. The front opening 106 of the cavity 110 may be coplanar with the distal ends 113 of the sidewalls. Furthermore, the housing 100 comprises a frame 114 which extends from the distal ends 113 of the plurality of sidewalls in a direction away from the cavity 110. In the exemplified embodiment, the frame 114 extends perpendicularly from the sidewalls 102, 103, 104, 105, but it could be oblique in other embodiments. The frame 114 forms a flange that surrounds the front opening 106 of the cavity 110. The frame 114 has a front surface 115 that interfaces with or faces an inner surface 201 of the door 200 when the door 200 is closed. There may be a gap between the front surface 115 of the frame 114 and the inner surface 201 of the door 200 when the door 200 is closed in some embodiments.

In the exemplified embodiment, there are a plurality of shelves 190 extending horizontally within the cavity 110 from the left sidewall 102 to the right sidewall 103. The shelves may be formed from any desired rigid material, such as plastic, glass, wood, or the like. The shelves 190 may be coupled to or supported by pins or other support members that are coupled to the left and right sidewalls 102, 103 of the housing 100. Although two shelves are shown in FIG. 1, more or less than two shelves could be used in other embodiments. The exact structure, shape, and other details of the shelves 190 including the spacing therebetween and their specific positioning within the cavity 110 of the housing 100 are not to be limiting of the present invention unless specified otherwise.

The door 200 is coupled to the housing 100 by one or more hinges to permit the door 200 to be altered between the open and closed states. In the exemplified embodiment, the door 200 is hingedly coupled to the left sidewall 102 of the housing 100. However, the invention is not to be so limited in all embodiments and the door 200 could instead be hingedly coupled to the right sidewall 103 of the housing 100. The door 200 could also be hingedly coupled to the top or bottom sidewalls 104, 105 in other embodiments, although this would be a less traditional approach. Moreover, the door 200 could be a slidable door rather than one that pivots about a hinge relative to the housing 100. Thus, the door 200 could be coupled to the housing 100 in such a way so that the door 200 can slide leftwards, rightwards, upwards, or downwards to open and/or close the front opening 106 of the cavity 110.

Figure 7A:
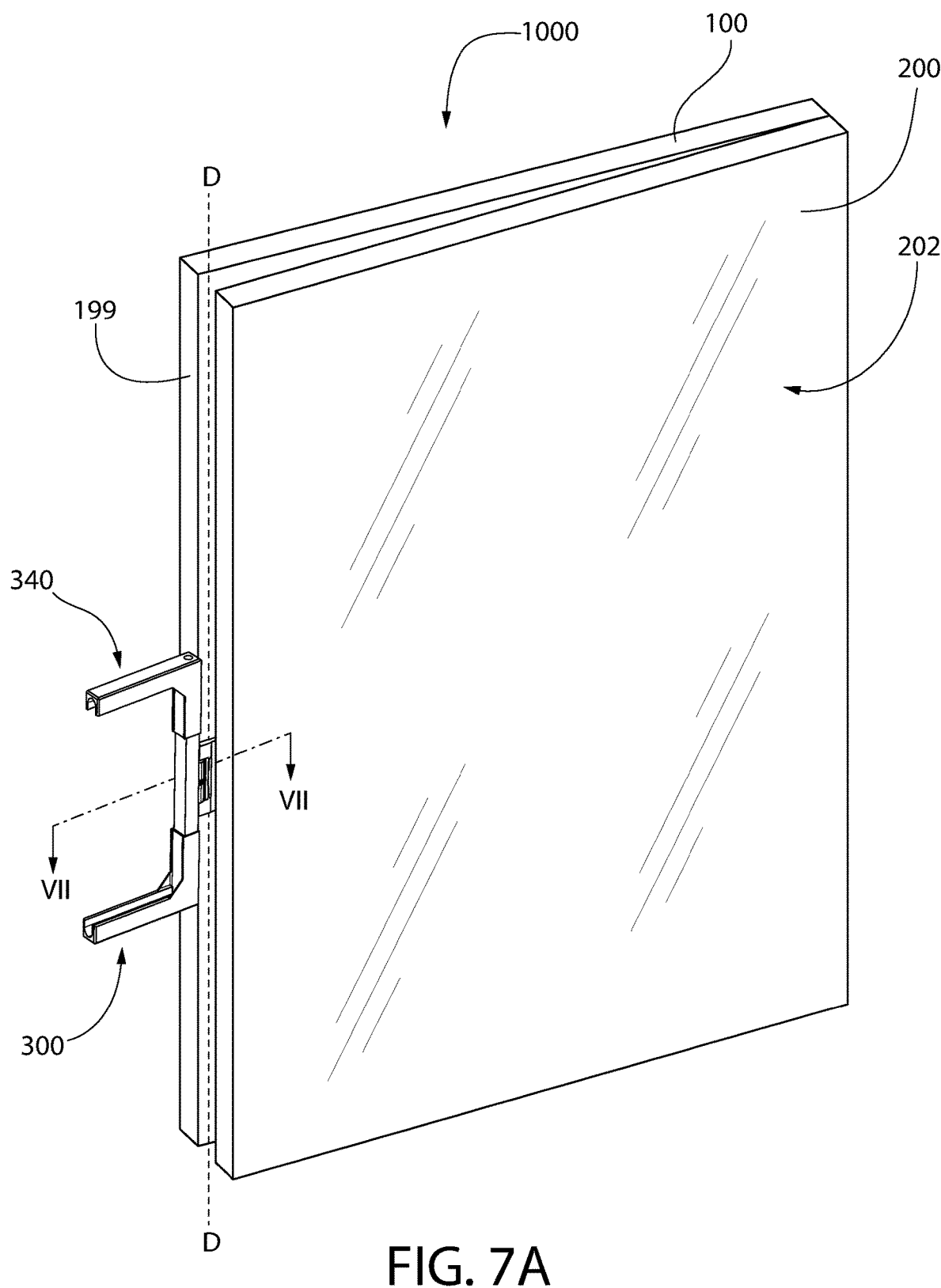
FIG. 7A is a perspective view of the cabinet apparatus of FIG. 1 with the door in the closed state and the holding component of the support assembly in the deployed position.

Moreover, in some embodiments the coupling of the door 200 to the housing 100 may be interchangeable so that a user can decide whether to couple the door 200 to the left sidewall 102 or the right sidewall 104, which may be dictated by the location at which the cabinet apparatus 1000 is to be hung. Regardless of the specific manner in which the door 200 is coupled to the housing 100, the door 200 is alterable between: (1) an open state, as shown in FIG. 1, whereby the front opening 106 of the cavity 110 is exposed to provide access into the cavity 110; and (2) a closed state, as shown in FIG. 7A, whereby the door 200 closes the front opening 106 of the cavity 110. Thus, when a user desires to gain access to items stored in the cavity 106 (such as on the shelves, on the bottom sidewall 105, or the like), the user will open the door 200 to expose the front opening 106. Upon removing or replacing the desired items from the cavity 110, the user will close the door 200.

The door 200 comprises the inner surface 201 which faces the cavity 110 when the door 200 is in the closed state and an outer surface 202 (shown, for example, in FIG. 7A). The outer surface 202 may be a mirrored surface in some embodiments. Thus, the outer surface 202 of the door 200 may be or comprise a mirror so that a user can see his/her reflection therein. Thus, a user may perform daily hygiene activities with the door 200 closed so that the user can see him or herself performing such daily hygiene activities. Of course, the outer surface 202 of the door 200 is not required to be a mirrored surface in all embodiments. It is also possible for the inner surface 201 to be mirrored in some embodiments.

Figure 3:
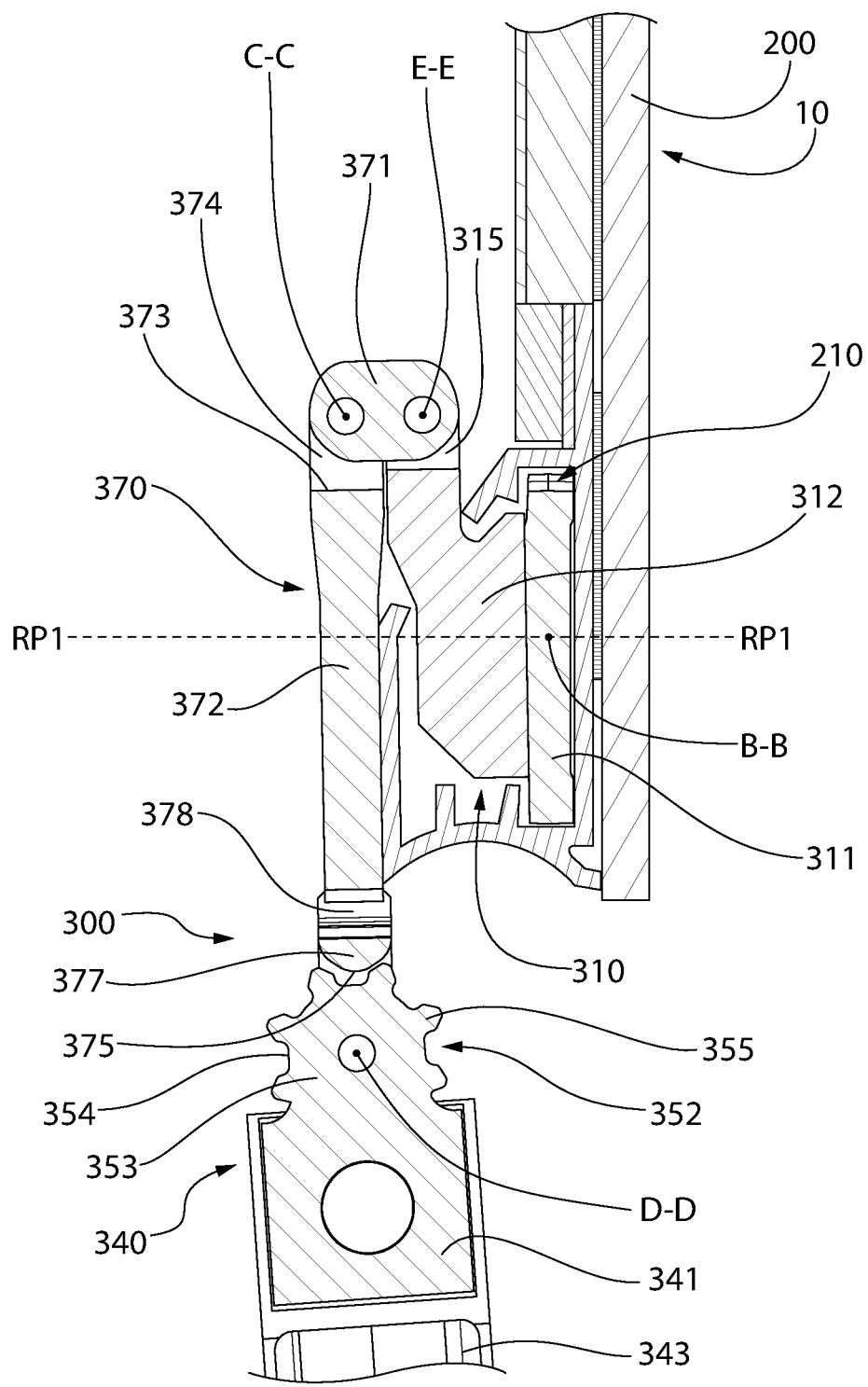
FIG. 3 is a cross-sectional view taken along line III-III of FIG. 1.

In the exemplified embodiment, there is a track 210 formed into the inner surface 201 of the door 200. The track 210 is a channel in the inner surface 201 of the door 200 to which the support assembly 300 may be coupled. As best shown in FIGS. 1 and 3, in the exemplified embodiment the track 210 is located adjacent to a distal edge 220 of the door 200, which is the edge of the door 200 that is furthest from the housing 100. However, the track 210 can be located elsewhere along the door 200 in other embodiments. Moreover, in the exemplified embodiment the track 210 extends along an entirety of the height of the door 200 from a bottom edge of the door 200 to a top edge 222 of the door 200. In other embodiments, the track 210 may extend along only part of the height of the door 200. In the exemplified embodiment, the track 210 extends along a vertical axis B-B that is parallel to the longitudinal axis A-A of the cabinet assembly 10. Thus, many variations to the location and positioning of the track 210 are possible within the scope of the invention described herein.

As described above and shown in the figures, in the exemplified embodiment the support assembly 300 is coupled to the door 200, and more particularly to the inner surface 201 of the door 200 where the track 210 is located. However, the invention is not to be so limited in all embodiments and in other embodiments the support assembly 300 may be coupled to the housing 100 rather than to the door 200. For example, the housing 100 may comprise a track or channel formed into an inner surface of one of the sidewalls 102-105 or along the rear wall 101 for purposes of coupling the support assembly 300 to the housing 100. Thus, in some embodiments the support assembly 300 may be coupled to the cabinet assembly 10, which includes the housing 100 and the door 200, such that the support assembly 300 may be coupled to either the housing 100 or the door 200 in various different embodiments.

Referring to FIGS. 1 and 3-5 concurrently, the support assembly 300 generally comprises a mounting assembly 310 that is coupled to the cabinet assembly 100, a holding component 340 that is configured to hold an article for viewing by a user, and a linkage assembly 370 that is pivotably or rotationally coupled to each of the mounting assembly 310 and the holding component 340 to facilitate various types of movement of the support assembly 300 relative to the cabinet assembly 100. The details of these general components and/or assemblies of the support assembly 300 will be described in greater detail below with reference The mounting assembly 310 comprises a mounting plate 311 and a connection plate 312 that is fixedly coupled to the mounting plate 311. The connection plate 312 may be coupled to the mounting plate 311 using fasteners such as screws, nails, bolts, or the like, or using adhesive or other techniques. Although in the exemplified embodiment the mounting plate 311 and the connection plate 312 are two separate components that are coupled together, in other embodiments the mounting plate 311 and the connection plate 312 may be part of an integral and unitary (i.e., monolithic) structure. In the exemplified embodiment, the mounting plate 311 is a flat plate that fits within the track 210 in the door 200 to couple the support assembly 300 to the cabinet assembly 10. In some embodiments, during assembly the mounting plate 311 is first placed within the track 210, and then the connection plate 312 is coupled to the mounting plate 311.

The mounting plate 311 may be coupled to the cabinet assembly 10 (such as within the track 210) via a friction fit or an interference fit so that the mounting plate 311 is stationary until an upward or downward force is applied onto the support assembly 300 to move it upwardly or downwardly relative to the cabinet assembly 10. In other embodiments, the mounting plate 311 may be coupled to the cabinet assembly 10 within the track 210 using an actuatable clip or bow clip such as described in U.S. Pat. No. 9,211,004, issued Dec. 15, 2015, the entirety of which is incorporated herein by reference. In still other embodiments, the mounting plate 311 may be coupled to the cabinet assembly 10 within the track 210 so that the mounting plate 311 is slidable within the track 210 using other techniques and structures, including ratchet mechanisms, depressible locking members that in a normal state hold the mounting plate 311 in place and when actuated permit a user to slide the mounting plate 311 (and the support assembly 300) upwardly and downwardly relative to the cabinet assembly 10 within the track 210. In yet other embodiments, the mounting plate 311 may be located within the track 210 and then held in place using a set screw, such that upon loosening the set screw the mounting plate 311 can be moved along the track 210 and upon tightening the set screw the mounting plate 311 is held in place. Thus, there are many different ways that the mounting plate 311 can be coupled to the cabinet assembly 10 while permitting the mounting plate 311 (and hence the support assembly 300 in its entirety) to be held in a fixed elevation and then, when desired, moved upwardly and downwardly to adjust its elevation along the cabinet assembly 10. In all embodiments described herein, the mounting plate 311 remains disposed within the track 210 and therefore coupled to the cabinet assembly 10 as it moves upwardly and downwardly along the vertical axis B-B.

Figure 2:
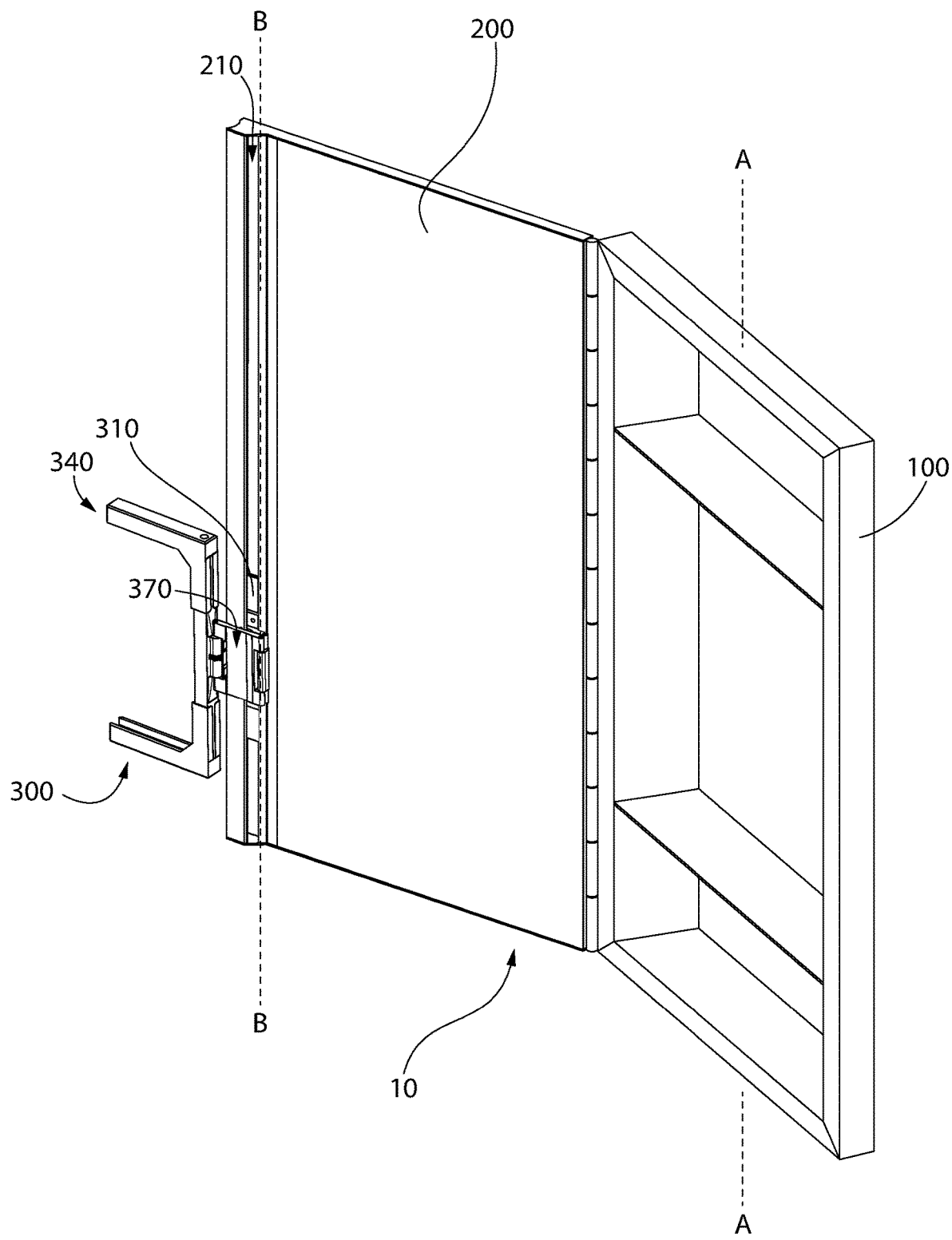
FIG. 2 is the perspective view of the cabinet apparatus of FIG. 1 with the support assembly having been moved downwardly relative to the cabinet assembly in a vertical direction.

Referring briefly to FIGS. 1 and 2, due to the interaction between the mounting assembly 310 and the track 210, the support assembly 300 is configured to move/slide upwardly and downwardly in a vertical direction along the vertical axis B-B that is parallel to the longitudinal axis A-A of the cabinet assembly 10. Thus, the support assembly 300 is movable vertically along the vertical axis B-B in opposing directions parallel to the longitudinal axis A-A of the cabinet assembly 10 to alter an elevation at which the support assembly 300 (or the holding component 340 thereof) is positioned along the cabinet assembly 10. Specifically, moving from FIG. 1 to FIG. 2, the support assembly 300 has been moved downwardly along the vertical axis B-B so that it is located at a lower elevation along the cabinet assembly 10 (and relative to a floor surface or a countertop above which the cabinet apparatus 1000 is hung). Thus, the elevation or height at which the support assembly 300 is positioned may be modified to enhance its use depending on the height or size of the user. A shorter user may want to have the support assembly 300 positioned at a lower height/elevation than a taller user for viewing optimization. The mounting assembly 310 remains positioned in the track 210 during the vertical movement of the support assembly 300 along the vertical axis B-B. Due to the friction fit, interference fit, or other as mentioned above, the support assembly 300 is selectively movable along the vertical axis B-B, meaning that the support assembly 300 maintains its elevation/height until a user intervenes and imparts a force onto the support assembly 300 to adjust its elevation/height.

As will be described in greater detail below, the holding component 340 of the support assembly 300 is configured to hold an article, which in one embodiment may be an electronic device such as a tablet, a smart phone, or the like. Thus, the user will want the holding component 340 and the article to be at a desirable elevation so that the user does not need to strain his/her neck to view the article. The up/down adjustability along the vertical axis B-B as described above makes this possible. The top and bottom ends of the track 210 may have stopper features (e.g., walls) that prevent the mounting plate 311 from being removed from the track 210 via the ends thereof.

Referring again to FIGS. 1 and 3-5, the support assembly 300 will continue to be described. As mentioned above, the connection plate 312 is fixedly coupled to the mounting plate 311 so that the connection plate 312 does not move relative to the mounting plate 311 under normal use. The connection plate 312 comprises a plate portion 313 having apertures for receiving fasteners as described herein and a connection portion 314 that facilitates the coupling of the mounting assembly 310 to the linkage assembly 370. In the exemplified embodiment, the connection portion 314 comprises a pair of tabs 315 protruding from an end thereof in a spaced apart manner. A hinge pin 371 of the linkage assembly 370 is configured to be received in the space between the pair of tabs 315 to facilitate a pivoting connection between the linkage assembly 370 and the mounting assembly 310, as described in greater detail below.

The linkage assembly 370 comprises the hinge pin 371 and a hinge plate 372. The hinge plate 372 comprises a first end 373 having a first attachment portion 374 and a second end 375 having a second attachment portion 376. More specifically, the first attachment portion 374 comprises two tabs extending from the first end 373 of the hinge plate 372 in a spaced apart manner and the second attachment portion 376 comprises two tabs extending from the second end 375 of the hinge plate 372 in a spaced apart manner. The hinge pin 371 described above is configured to be received within the space between the pair of tabs 315 of the mounting assembly 310 and within the space between the pair of tabs of the first attachment portion 374 of the hinge plate 372. As seen in the figures, the hinge pin 371 and the various tabs have apertures formed therein so that a pin (see pins 380, 381, 382) can be inserted therethrough to facilitate the coupling of the hinge pin 371 to each of the mounting assembly 310 and the hinge plate 372. The coupling should be done in such a way so that the hinge pin 371 remains rotatable relative to the mounting assembly 310 and the hinge plate 372 remains rotatable relative to the hinge pin 371. Each of the pins 380, 381, 382 may have a cap or bolt or head on one or both of its opposing ends to maintain the various components in a coupled state, while permitting the rotation between the various components as noted herein. As will be described in greater detail below, the connection between the hinge pin 371 and the hinge plate 372 forms a first rotational axis C-C and the connection between the hinge pin 371 and the mounting assembly 310 forms a third rotational axis E-E that is parallel to the first rotational axis C-C.

In the exemplified embodiment the holding component 340 comprises a base member 341, a first clamp arm 342 coupled to the base member 341, and a second clamp arm 343 coupled to the base member 341. In the exemplified embodiment, each of the first and second clamp arms 342, 343 is movably coupled to the base member 341, although in other embodiments only one of the first and second clamp arms 342, 343 may be movably coupled to the base member 341 with the other one of the first and second clamp arms 342, 343 being fixedly coupled to the base member 341. In the exemplified embodiment, each of the first and second clamp arms 342, 343 has an "L" shape so that an article (such as a tablet, smart phone, or the like) can be clamped between the first and second clamp arms 342, 343 to hold the article in place. Thus, the first clamp arm 342 has a coupling portion 345 which couples to the base member 341 and a holding portion 346 which holds the article and the second clamp arm 343 has a coupling portion 347 which couples to the base member 341 and a holding portion 348 which holds the article. The holding portions 346, 348 extend perpendicularly from the coupling portions 345, 347. Furthermore, the holding portions 346, 348 of the first and second clamp arms 342, 343 have a channel 344 formed in a bottom surface thereof for receiving a portion of the article to facilitate the ability of the holding component 340 to hold the article.

In the exemplified embodiment, the coupling portions 345, 347 of the first and second clamp arms 342, 343 are configured to slide over opposing end portions of the base member 341 to couple the first and second clamp arms 342, 343 to the base member 341. Furthermore, the first and second clamp arms 342, 343 may be coupled to the base member 341 using fasteners, such as screws, inserted through openings in the various components. In such embodiments, the fasteners may be tightened or loosened to allow the first and second clamp arms 342, 343 to move relative to the base member 341 either towards or away from one another to accommodate articles of different size. Thus, the size of the space between the holding portions 346, 348 of the first and second clamp arms 342, 343 can be altered or modified so that the first and second clamp arms 342, 343 can hold articles of varying size, such as tablets in one configuration and a smart phone in another configuration. As should be appreciated, the holding component 340 holds one or more articles in a detachable fashion such that the articles can be separated from the holding component 340 as desired. This will allow a user to determine the particular article that he/she desires to have held by the holding component 340 and also allows the user to interchange the article with another article as desired.

In other embodiments, the first and/or second clamp arms 342, 343 may be coupled to the base member 341 using a spring. For example, the first and/or second clamp arms 342, 343 may be coupled to the base member 341 via an extension spring. As a result, a user can pull the first and/or second clamp arms 342, 343 away from one another to insert an article into the space between the first and second clamp arms 342, 343. Upon releasing the first and/or second clamp arms 342, 343, the first and/or second clamp arms 342, 343 will be biased, via the extension spring, in a direction back towards one another. This force of the spring will hold the article tightly between the first and second clamp arms 342, 343. Although in the exemplified embodiment the invention is described such that both of the first and second clamp arms 342, 343 are movable relative to the base member 341, the invention is not to be so limited in all embodiments and in some other embodiments only one of the first and second clamp arms 342, 343 may be movable relative to the base member 341. Use of the holding component 340 to hold and secure an article will be described in greater detail below with reference to FIGS. 11A and 11B.

The base member 341 has a front surface 350 that faces the space defined for holding an article and a rear surface 351 opposite the front surface 350. Furthermore, the base member 341 comprises an attachment member 352 on the rear surface 351 for coupling the holding component 340 to the linkage assembly 370. More specifically, the attachment member 352 comprises a cylindrical element 353 that extends from the rear surface 351 of the base member 341. The cylindrical element 353 has an outer surface 354 that is rounded in the exemplified embodiment, which facilitates the rotational/pivoting movement between the holding component 340 and the hinge plate 372 as described in greater detail herein below. The attachment member 352 also comprises a plurality of protuberances 355 extending from the outer surface 354 of the cylindrical element 353. The plurality of protuberances 355 form a part of a locking feature or locking mechanism that can lock the holding component 340 into any one of a plurality of orientations relative to the hinge plate 372 and the cabinet assembly 10 as described in greater detail herein below with particular reference to FIGS. 7A-8B.

The holding component 340 can have other structures and components that are different than the exemplified embodiment in alternative embodiments so long as the function remains as disclosed herein. There are many different permutations for the structure of the holding component 340 that will result in a structure that functions in accordance with the teachings set forth herein in terms of rotation relative to the cabinet assembly 10 and ability to hold one or more articles. Thus, while one exemplary embodiment is being described herein, it should be appreciated that the invention is not to be limited by the disclosed structure for the holding component in all embodiments.

The holding component 340 is coupled to the hinge plate 372 of the linkage assembly 370 by inserting the attachment member 352 into the space between the tabs of the second attachment portion 376 and then inserting the pin 382 through the apertures in the tabs of the second attachment portion 376 and the aperture in the attachment member 352. As a result of this manner of attachment, the holding component 340 is capable of rotating relative to the hinge plate 372, with the axis of the pin 382 forming the rotational axis upon which the holding component 340 can rotate relative to the hinge plate 372. As will be described below, this rotation of the holding component 340 relative to the hinge plate 372 can alter a viewing angle of the article and can alter an angle at which the holding component 340 protrudes from a periphery of the cabinet assembly 10 when the holding component 340 is deployed as described herein.

As best seen in FIG. 3, the protuberances 355 of the attachment member 352 of the holding component 340 interact with the second end 375 (also referred to as an end surface) of the hinge plate 372 to form a locking mechanism or locking feature. The second end 375 of the hinge plate 372 is located on a locking feature 377 of the hinge plate 372. The hinge plate 372 has a through-hole 378 that extends between the locking feature 377 of the hinge plate 372 and the remainder of the hinge plate 372 to enable the locking feature 377 to deflect into the through-hole 378 as needed to permit the protuberances 355 to pass over the locking feature 377 to change the orientation of the holding component 340 as described further herein below.

In the exemplified embodiment, the second end 375 or end surface of the hinge plate 372 (which is the distal end of the locking feature 377) has a convex or rounded/domed shape. This allows the protuberances 355 to pass over the second end 375 of the hinge plate 372 when a sufficient force is applied to the holding component 340. Specifically, as the holding component 340 is made to rotate relative to the hinge plate 372, the interaction between the protuberances 355 and the second end 375 of the hinge plate 372 will make it so that a reasonable force needs to be applied to the holding component 340 to enable the protuberances 355 to pass over the second end 375 of the hinge plate 372. As the protuberances 355 pass over the second end 375 of the hinge plate 372, either the second end 375 of the hinge plate 372 or the protuberances 355 may deflect to enable the rotation described herein. Specifically, in the exemplified embodiment the locking feature 377 of the hinge plate 372 will deflect into the through-hole 378 as the protuberances 355 pass over the second end 375 of the hinge plate 372. The protuberance 355 and their interaction with the second end 375 of the hinge plate 372 ensures that the holding component 340 does not rotate freely relative to the hinge plate 372, but instead requires some user force to rotate the holding component 340 relative to the hinge plate 372. This prohibition on free rotation due to the locking feature/mechanism formed by the interaction of the protuberances 355 and the second end 375 of the hinge plate 372 ensures that once the holding component 340 is positioned at the desired viewing angle, it will not be readily moved away from that viewing angle without specific user interaction. It should be appreciated that the protuberances 355 could be omitted in some embodiments where such a locking feature is not needed or not desired.

Figure 4:
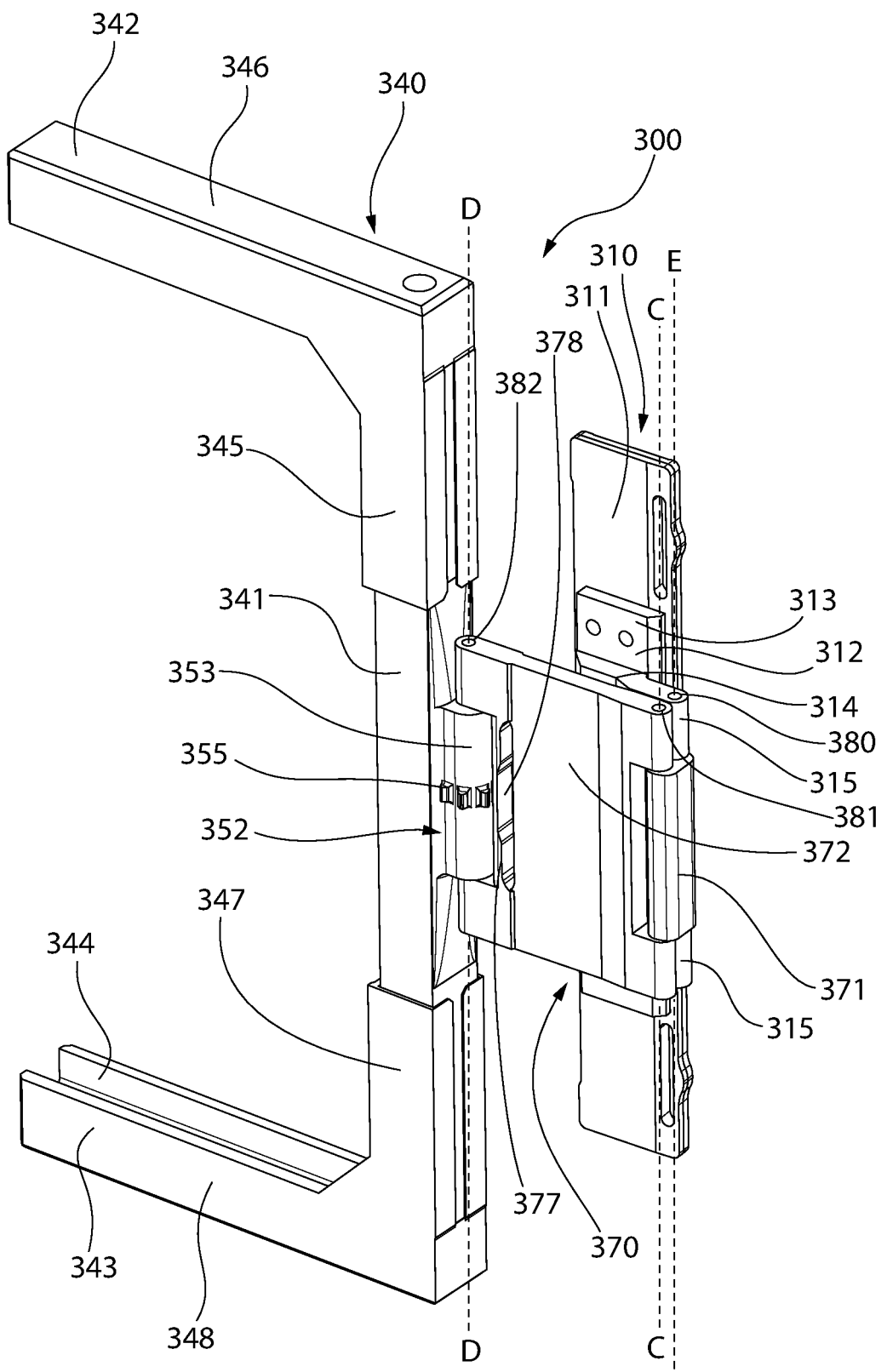
FIG. 4 is a perspective view of the support assembly of FIG. 1.
Figure 5:
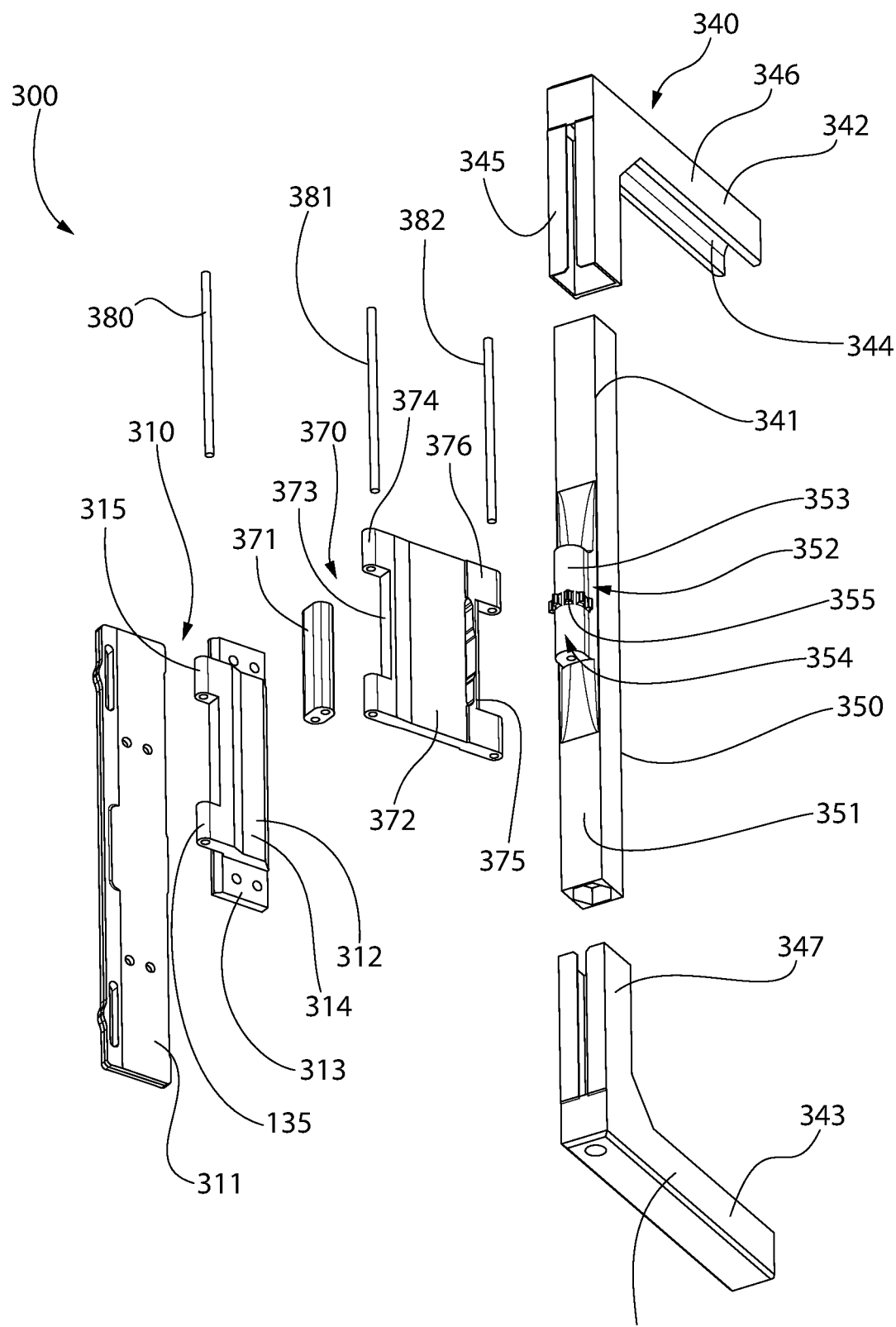
FIG. 5 is an exploded view of the support assembly of FIG. 4.

The support assembly 300 is able to move vertically in opposing directions along the vertical axis B-B relative to the cabinet assembly 10 as described above with reference to FIGS. 1 and 2. Furthermore, the holding component 340 is also able to move rotationally relative to the cabinet assembly 10 with multiple degrees of freedom. Referring to FIGS. 3 and 4, the different types of rotational movement of the holding component 340 relative to the cabinet assembly 10 will be described.

The holding component 340 is rotatable relative to the cabinet assembly 10 about a first rotational axis C-C and a second rotational axis D-D. The first and second rotational axes C-C, D-D are parallel to one another and spaced apart from one another. Furthermore, the first and second rotational axes C-C, D-D are parallel to the longitudinal axis A-A of the cabinet assembly 10. As mentioned above, the connection between the hinge pin 371 and the hinge plate 372 forms the first rotational axis C-C and the connection between the attachment element 352 of the holding component 340 and the hinge plate 372 forms the second rotational axis D-D. In the exemplified embodiment, the holding component 340 is also rotatable relative to the cabinet assembly 10 about a third rotational axis E-E, with the third rotational axis E-E being formed at the connection between the hinge pin 371 and the mounting assembly 310. The third rotational axis E-E is also parallel to and spaced apart from the first and second rotational axes C-C, D-D.

Thus, as will be described in greater detail below, with the support assembly 300 coupled to the cabinet assembly 10 as described herein, the holding component 340 can be rotated about the first rotational axis C-C to be moved between a stowed position and a deployed position. In the stowed position, no portion of the holding component 340 protrudes from a periphery of the cabinet assembly 10. In the deployed position, the holding component 340 protrudes from the periphery of the cabinet assembly 10 so that the article being held thereby can be viewed and/or used by a user. Thus, the holding component 340 and the article being held thereby can be stored away and out of sight within the cavity 110 of the cabinet assembly 10 with the door 200 closed, or the holding component 340 can extend out of the cavity 110 of the cabinet assembly 10 for use. Rotation about the third rotational axis C-C may assist in the positioning of the holding component 340 within the cavity 110 when in the stowed position.

Furthermore, rotation of the holding component 340 about the second rotational axis D-D changes an angle at which the holding component 340 protrudes from the periphery of the cabinet assembly 200 when it is in the deployed state. When in the stowed state, rotation of the holding component 340 about the second rotational axis D-D changes a positioning of the holding component 340 within the cavity 210. These various ways of rotating and/or moving the holding component 340 relative to the cabinet assembly 10 will be described in greater detail below.

Figure 6:
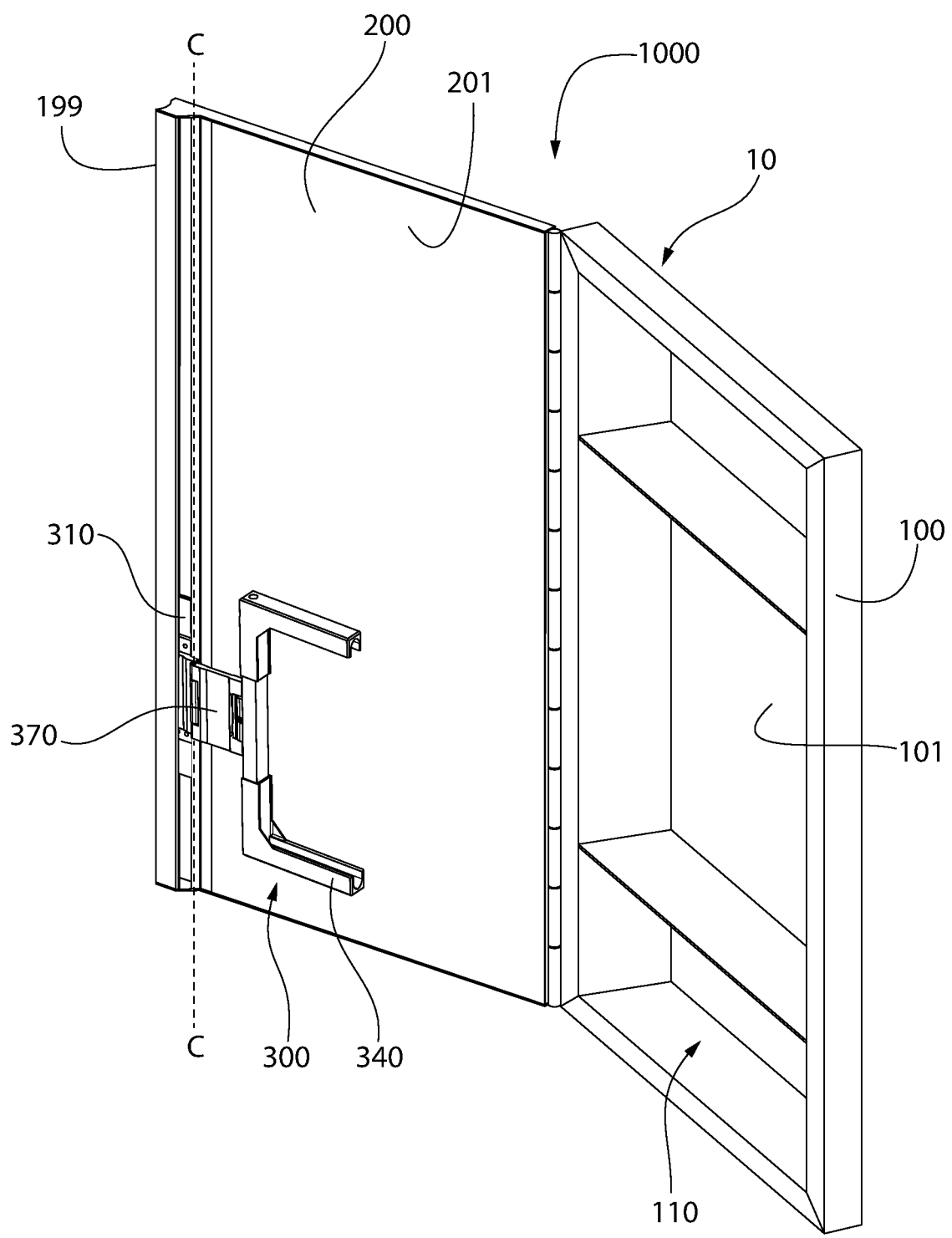
FIG. 6 is a perspective view of the cabinet apparatus of FIG. 1 with the door in an open state and the holding component of the support assembly in a stowed position.

Referring to FIGS. 1 and 6, rotation of the holding component 340 about the first rotational axis C-C will be described. The holding component 340 can be rotated about the first rotational axis C-C to alter the holding component 340 between a deployed position, shown in FIG. 1, and a stowed position, shown in FIG. 6. In the deployed position, the holding component 340 protrudes from a periphery 199 of the cabinet assembly 10. The periphery 199 of the cabinet assembly 10 may include a peripheral edge of the door 200 that is located between the front and rear surfaces 201, 202 of the door 200 and a peripheral edge of the housing 100 that is located between the front surface 115 of the frame 114 and a rear surface of the housing 100. Thus, the periphery 199 of the cabinet assembly 10 is the outer edge of the door 200 and the outer edge of the housing 100.

In the exemplified embodiment, in the deployed position the holding component 340 protrudes from the distal edge 220 of the door 200 (which forms a part of the periphery 199 of the cabinet assembly 10), but the invention is not to be so limited in all embodiments and the support assembly 300 could be positioned at other locations along the cabinet assembly 10 to change the exact location at which the holding component 340 protrudes from the periphery 199 of the cabinet assembly 10 when in the deployed position. For example, if the support assembly 300 is coupled to the housing 100 instead of to the door 200, in the deployed position the holding component 340 may protrude from the right sidewall 103 of the housing 100. Furthermore, when the holding component 340 is in the deployed position, the door can be closed, thereby leaving the holding component 340 located outside of the cavity (see, for example, FIG. 7A). In such a situation, the hinge plate 372 passes through a space between the inner surface 201 of the door 200 and the front surface 115 of the frame 114 of the housing 100, leaving the holding component 340 outside of the cavity 110 and in the viewing field of a user. When the holding component 340 is holding an article such as described herein, that article (and its display surface or the like) is also in the viewing field of the user.

Altering the holding component 340 from the deployed position shown in FIG. 1 to the stowed position shown in FIG. 6 requires rotating the holding component 340 about the first rotational axis C-C defined by the connection between the hinge plate 372 and the hinge pin 371. Thus, in rotating about the first rotational axis C-C, the holding component 340 and the hinge plate 372 rotate together while the mounting assembly 310 and the hinge pin 371 remain stationary. This results in the holding component 340 moving from a position where it protrudes from the periphery 199 of the cabinet assembly 10 to a position whereby the holding component 340 is adjacent to the inner surface 201 of the door 200. Of course, rotating the holding component 340 in the opposite direction about the first rotational axis C-C will alter the holding component 340 from the stowed position back to the deployed position.

In the stowed position shown in FIG. 6, no portion of the holding component 340 (and, more specifically, no portion of the support assembly 300) protrudes from the periphery 199 of the cabinet assembly 10. Thus, the support assembly 300 is located entirely within the bounds of the cabinet assembly 10 (and, more specifically, the door 200 in the exemplified embodiment because the support assembly 300 is coupled to the door 200). Once in the stowed position shown in FIG. 6, the door 200 can be closed, which will result in the holding component 340 being positioned within the cavity 110 of the housing 100 of the cabinet assembly 10 (it should be appreciated that when the door 200 is closed, the cavity 110 is defined as an entirety of the space between the inner surface 201 of the door 200 and the rear wall 101 of the housing 100). In the exemplified embodiment, the door 200 can be closed with the holding component 340 in either the stowed or deployed position. The first rotational axis C-C is located inside of the periphery 199 of the door 200 in the exemplified embodiment regardless of whether the holding component 340 is in the deployed position or the stowed position.

Stated another way, each side of the periphery 199 of the door 200 and/or the housing 100 may lie on a plane such that the planes collectively define a hollow cuboid. In the stowed position, the support assembly 300 is, in its entirety, located inside of the hollow cuboid defined by the planes of the door 200, inside the hollow cuboid defined by the planes of the housing 100, or both. In the deployed position, at least the holding component 340 of the support assembly 300 is located outside of the hollow cuboid defined by the planes of the door 200 and the housing 100.

In FIG. 6, the holding component 340 may not lie flat against the inner surface 201 of the door 200. Rather, in some embodiments the support assembly 300 may also be rotated about the third rotational axis E-E (shown in FIGS. 3 and 4) to cause the holding component 340 to lie flat against the inner surface 201 of the door 200 so that it takes up less space within the cavity 110 when the door 200 is closed. To rotate the support assembly 300 in this manner, the hinge pin 371 is rotated relative to the connection plate 312 of the mounting assembly 310.

Referring to FIGS. 7A-8B, the rotation of the holding component 340 relative to the cabinet assembly 10 about the second rotational axis D-D to modify a viewing angle of the holding component 340 will be described. In FIGS. 7A and 8A, the holding component 340 is in the deployed position as shown in FIG. 1 and the door 200 is closed. As noted previously, when the holding component 340 is in the deployed position, the door 200 may be closed as shown in FIG. 7A or open as shown in FIG. 1. In the deployed position with the door 200 closed, the holding component 340 extends or protrudes from the periphery 199 of the cabinet assembly 200. Furthermore, the second end 375 of the hinge plate 372 also protrudes from the periphery 199 of the cabinet assembly 10 when the holding component 340 is in the deployed position, which enables rotation of the holding assembly 340 about the second rotational axis D-D as described herein. Specifically, because the second rotational axis D-D is located externally of the periphery 199 of the cabinet assembly 10 when the holding component 340 is in the deployed position, rotation about the second rotational axis D-D is possible with the holding component 340 in the deployed position and the door 200 close. It should be appreciated that the second rotational axis D-D is located inside the cavity 110 when the holding component 340 is in the stowed position and the door 200 is closed (see FIGS. 10A and 10B, described below) and outside the cavity 110 when the holding component 340 is in the deployed position and the door 200 is closed (see FIGS. 7B and 8B).

Figure 7B:
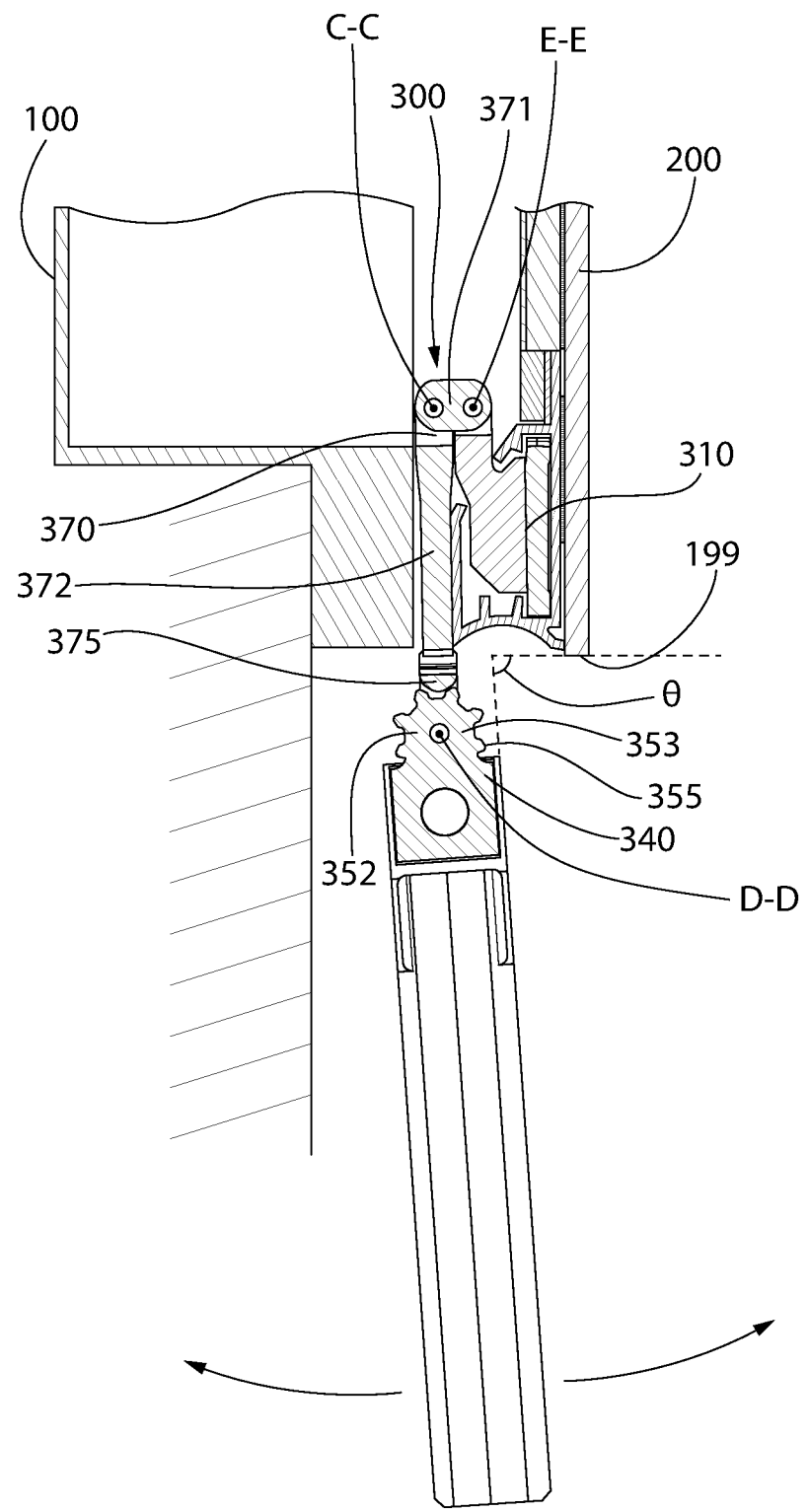
FIG. 7B is a cross-sectional view taken along line VII-VII of FIG. 7A.
Figure 8A:
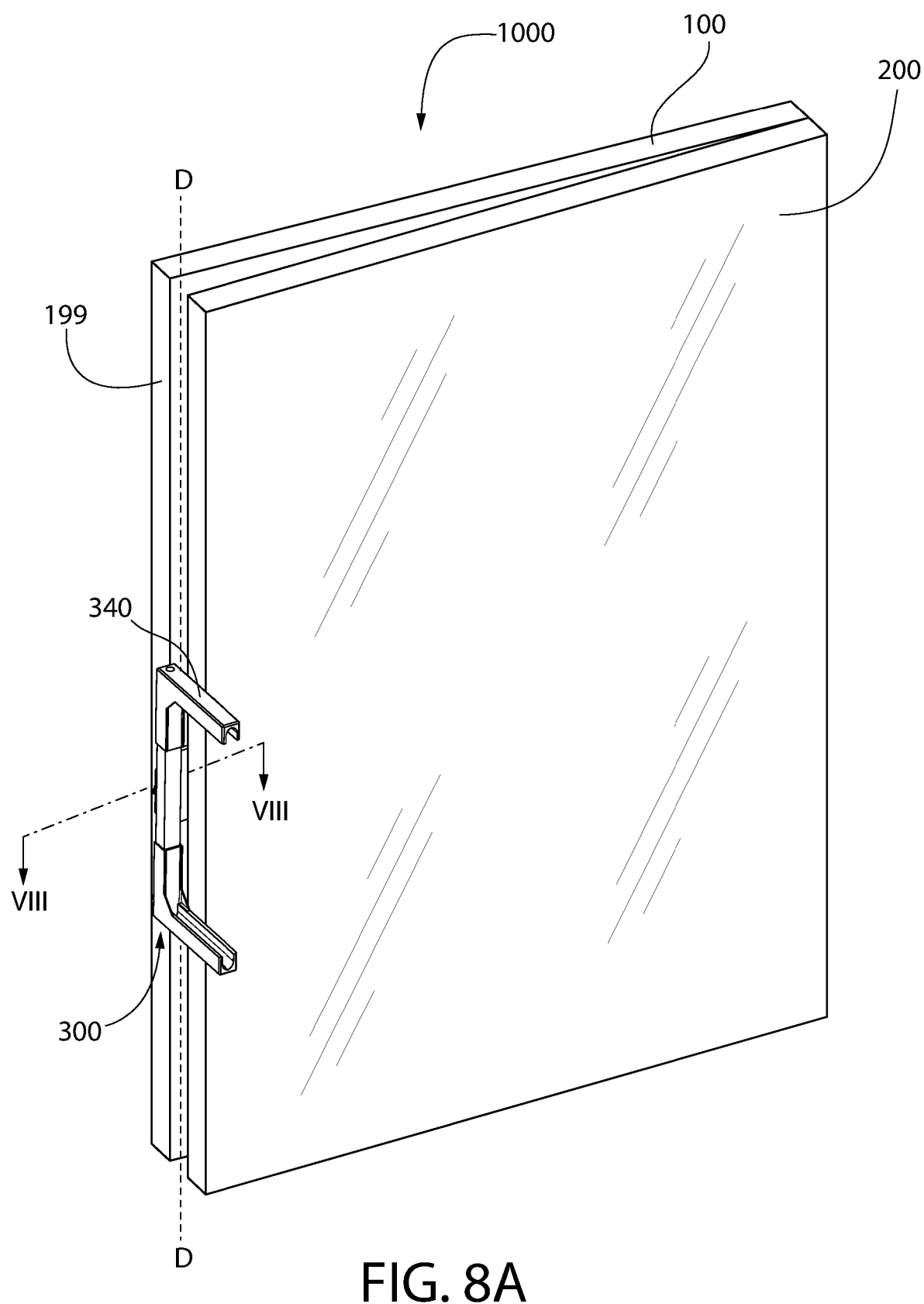
FIG. 8A is the perspective view of the cabinet apparatus of FIG. 7A with the holding component of the support assembly having been rotated relative to the cabinet assembly to alter a viewing angle thereof.
Figure 8B:
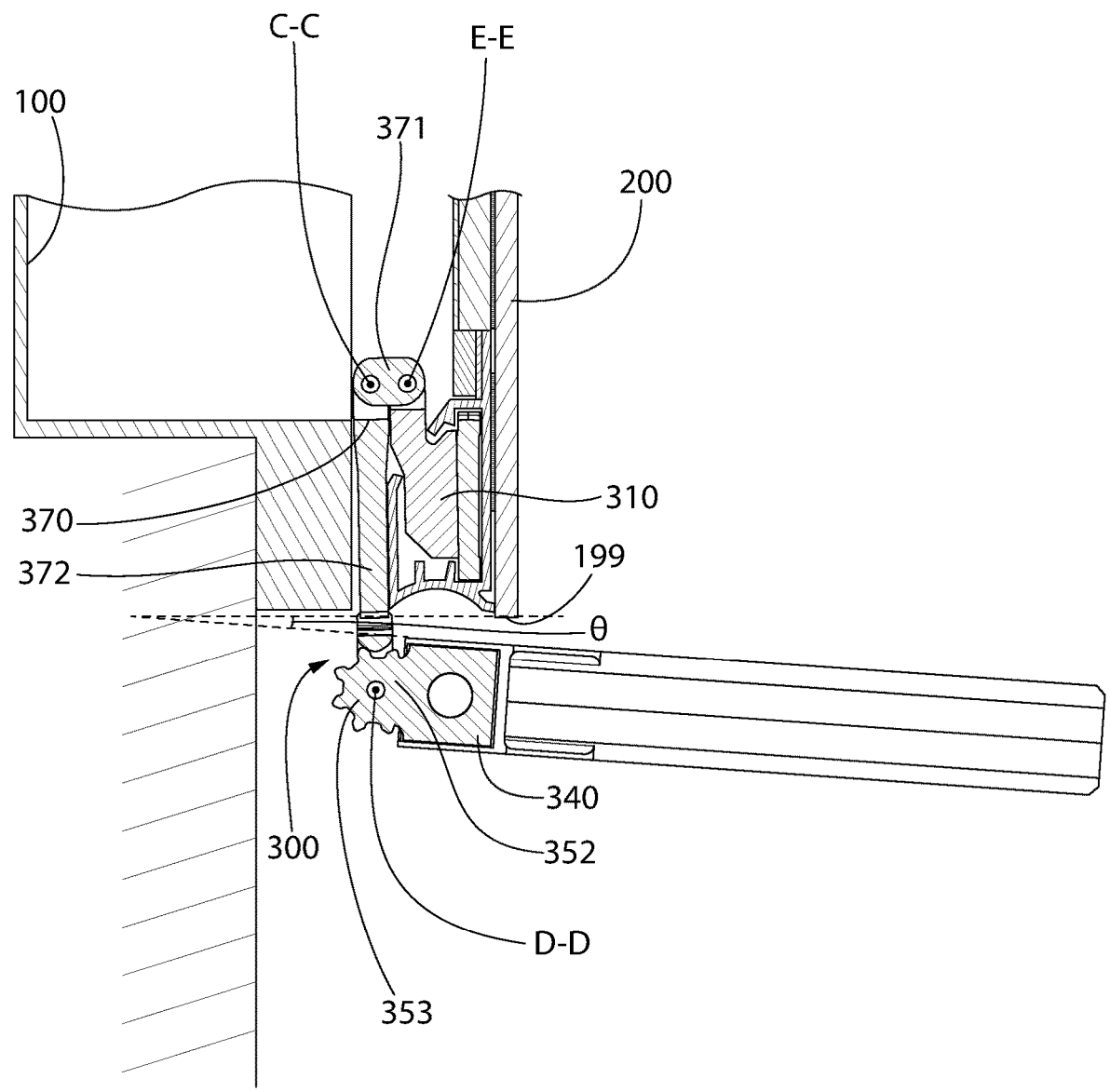
FIG. 8B is a cross-sectional view taken along line VIII-VIII of FIG. 8A.

Comparing FIGS. 7A and 7B to FIGS. 8A and 8B, it can be seen that the holding component 340 has been rotated about the second rotational axis D-D in a counterclockwise direction. To achieve this rotation, a user will grip the holding component 340 and move it in either a counterclockwise direction, although it should be appreciated that opposite direction of movement in the clockwise direction can also be accomplished as indicated by the arrows in FIG. 7B. Rotating the holding component 340 about the second rotational axis D-D when the holding component 340 is in the deployed position will change an angle θ at which the holding component 340 protrudes from the periphery 199 of the cabinet assembly 10. As shown in FIGS. 7B and 8B, the angle θ is measured between the periphery 199 of the cabinet assembly 10 when the door 200 is closed and a front-most viewing surface of the holding component 340.

In FIG. 7B the holding component 340 protrudes from the periphery 199 of the cabinet assembly 10 at an angle θ of approximately 90°, or perhaps just a bit less than 90° (e.g., between 85° and 90°). In FIG. 8B, the holding component 340 protrudes from the periphery 199 of the cabinet assembly 10 at an approximately 5° angle. The holding component 340 can be rotated about the second rotational axis D-D so as to protrude from the periphery 199 of the cabinet assembly 10 in any of a plurality of different angles. The locking feature formed by the protuberances 355 and the hinge plate 372 can be used to lock the holding component 340 at a desired position/angle relative to the cabinet assembly 10 in some embodiments. In the exemplified embodiment, the holding component 340 may be rotated between 1° relative to the cabinet assembly 10 and 135° relative to the cabinet assembly 10. Of course, the attachment member 352 and/or the hinge plate 372 can be designed to modify the span of angles at which the holding component 340 may be positioned relative to the periphery 199 of the cabinet assembly 10 in other embodiments.

Figure 9:
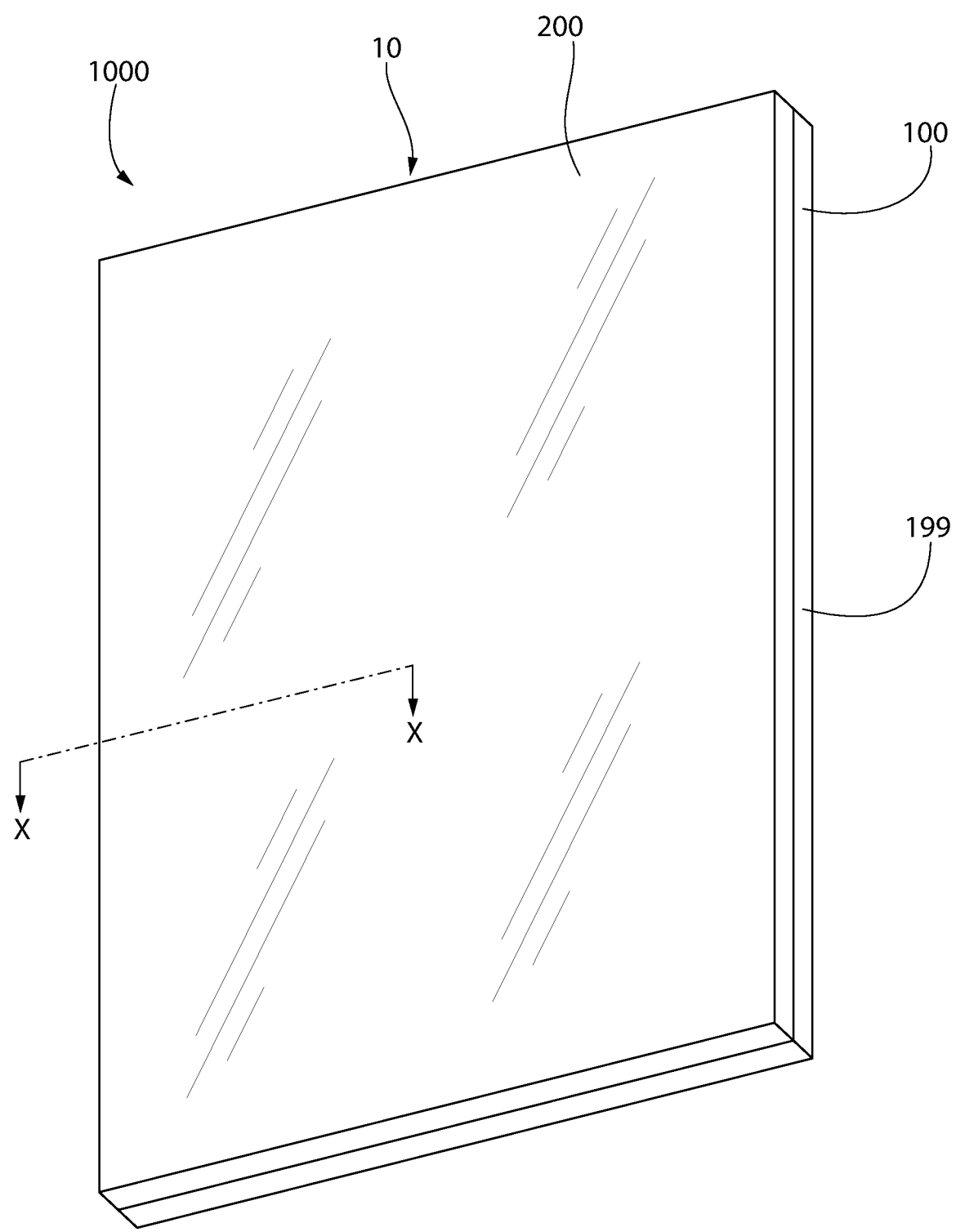
FIG. 9 is a perspective view of the cabinet apparatus of FIG. 1 with the door in the closed state and the holding component of the support assembly in the stowed position.

Referring to FIG. 9, the cabinet apparatus 1000 is illustrated with the door 200 in the closed state and the support assembly 300 in the stowed position. The support assembly 300 is not at all visible or exposed in FIG. 9 because when it is in the stowed position and the door 200 is closed, no portion of the support assembly 300 protrudes from the periphery 199 of the cabinet assembly 10 and thus it is not in the field of vision.

Figure 10A:
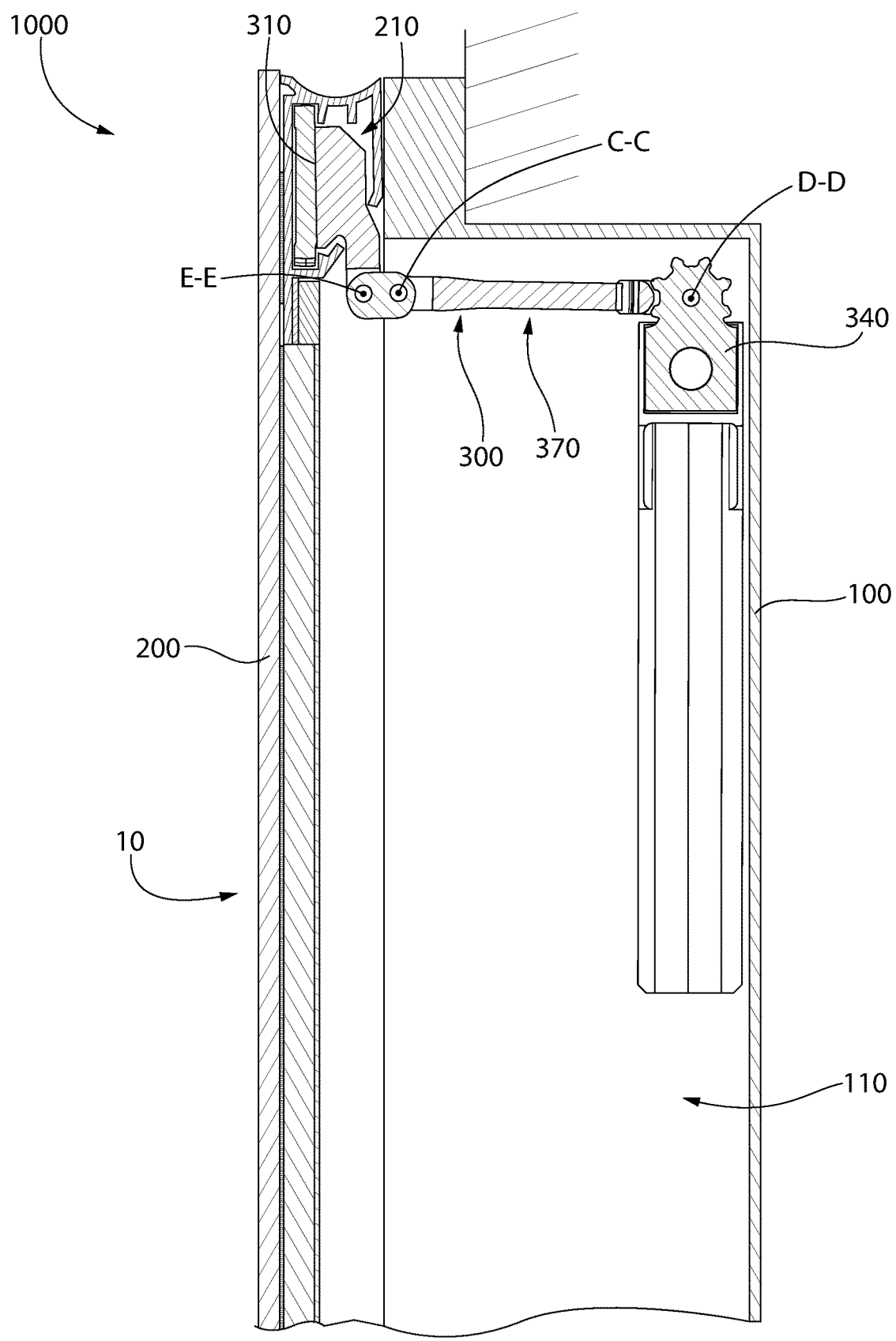
FIG. 10A is a cross-sectional view taken along line X-X of FIG. 9 with the holding component of the support assembly in a first stowed position.
Figure 10B:
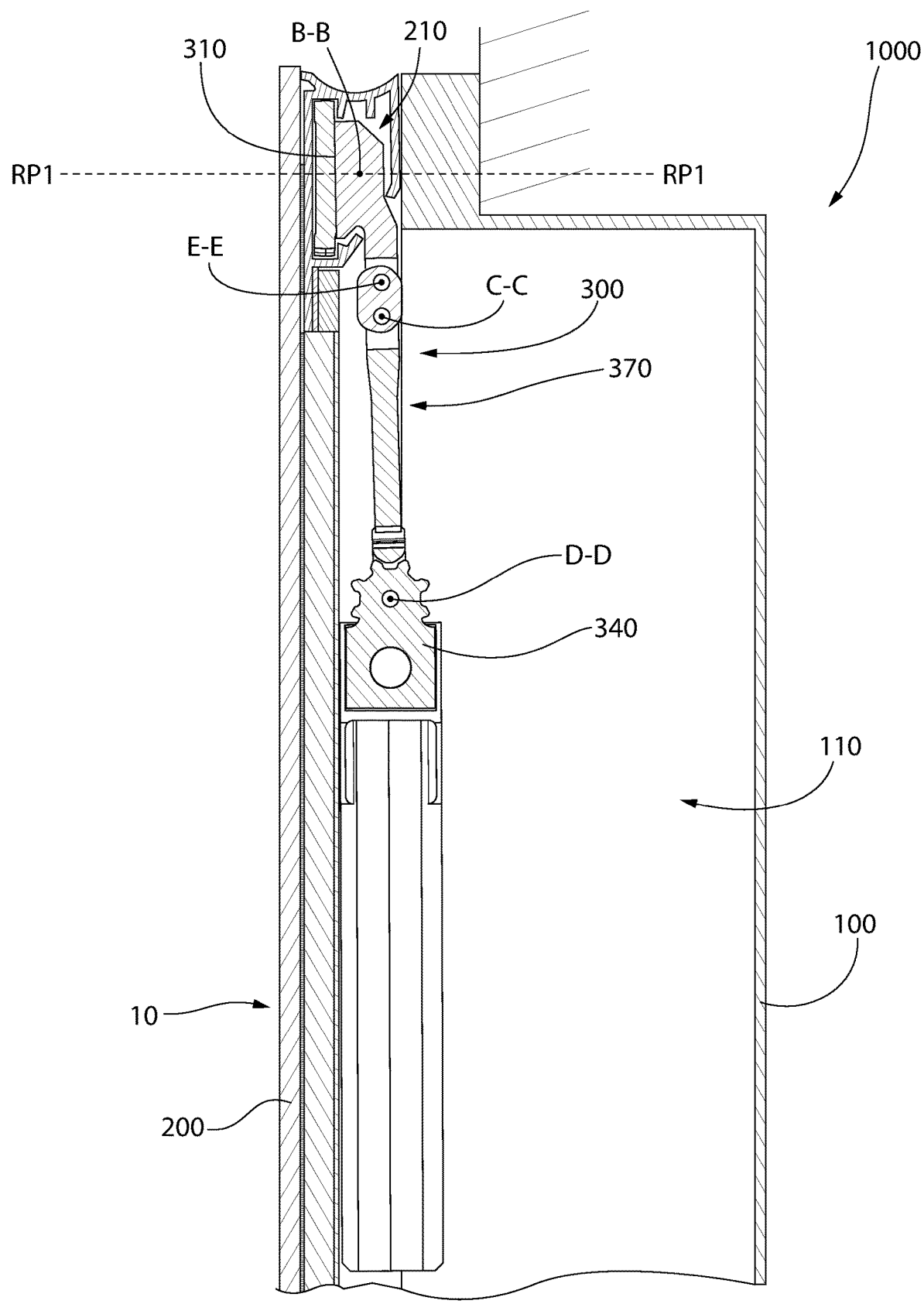
FIG. 10B is a cross-sectional view taken along line X-X of FIG. 9 with the holding component of the support assembly in a second stowed position.

FIGS. 10A and 10B illustrate different positions or configurations for the support assembly 300 when in the stowed position. Thus, referring to FIGS. 10A and 10B, the support assembly 300 is in the stowed position such that the support assembly 300, or portions thereof, are located within the cavity 110 of the housing 100 of the cabinet assembly 10. The mounting assembly 310 of the support assembly 300 is disposed within the track 210 and the positioning of the linkage assembly 370 and the holding component 340 can be adjusted by rotating the various components about the first, second, and third rotational axes C-C, D-D, E-E. Thus, moving from FIG. 10A to 10B requires rotating the support assembly 300 about each of the first, second, and third rotational axes C-C, D-D, E-E. When the support assembly 300 is in the stowed position and the door 200 is closed, the first, second, and third rotational axes C-C, D-D, E-E are all located inside the cavity 110 of the housing 100.

Referring briefly to FIG. 3, the vertical axis B-B lies in a reference plane RP1-RP1 that is perpendicular to the door 200. When the holding component 340 is in the deployed position as shown in FIG. 3, the first and second rotational axes C-C, D-D are located on opposite sides of the reference plane RP1-RP1. As shown in FIGS. 10A and 10B, when the holding component 340 is in the stowed position, the first and second rotational axes C-C, D-D are located on the same side of the reference plane RP1-RP1.

Figure 11A:
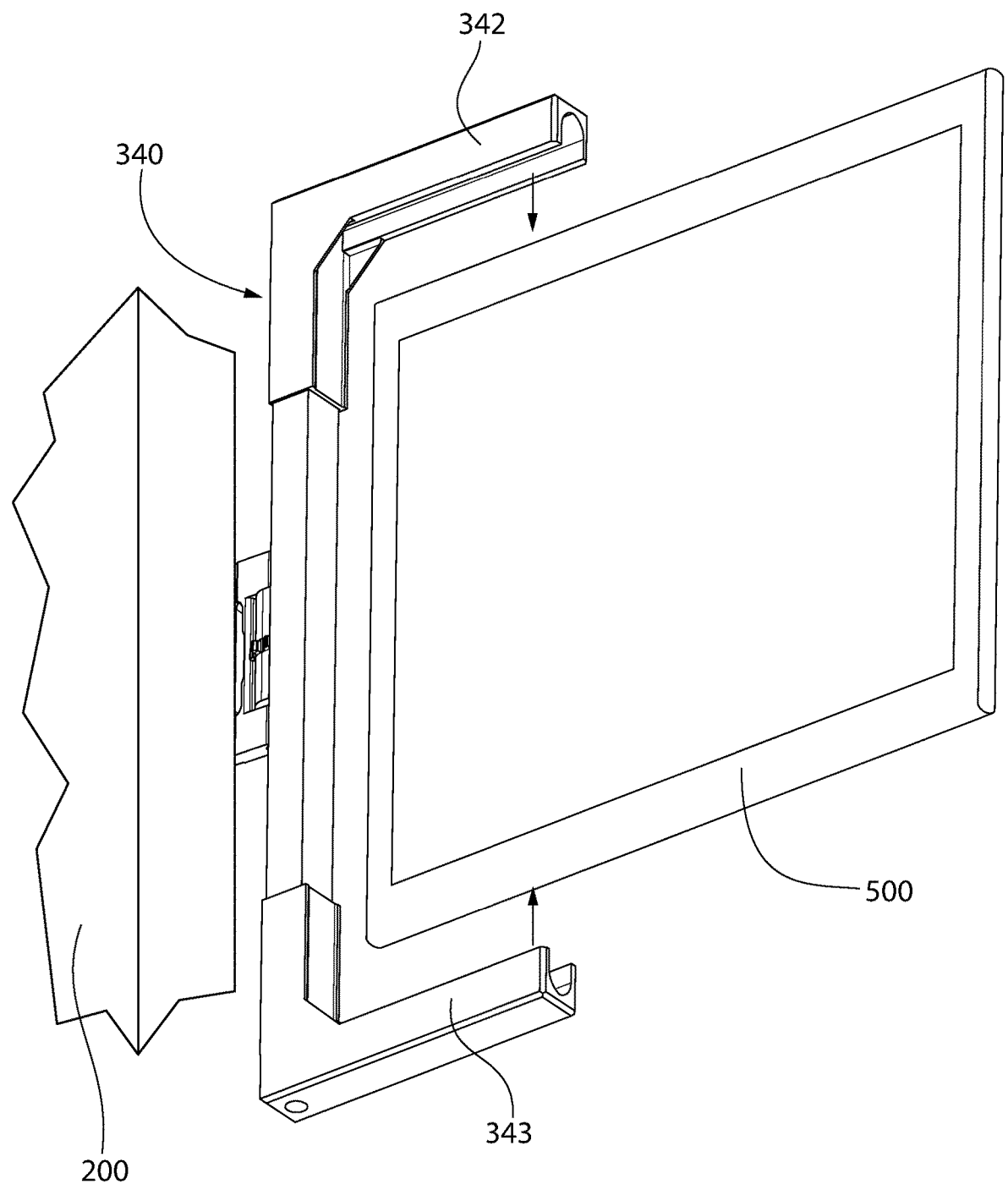
FIGS. 11A and 11B illustrate the process of coupling an article to the holding component in accordance with an embodiment of the present invention.
Figure 11B:
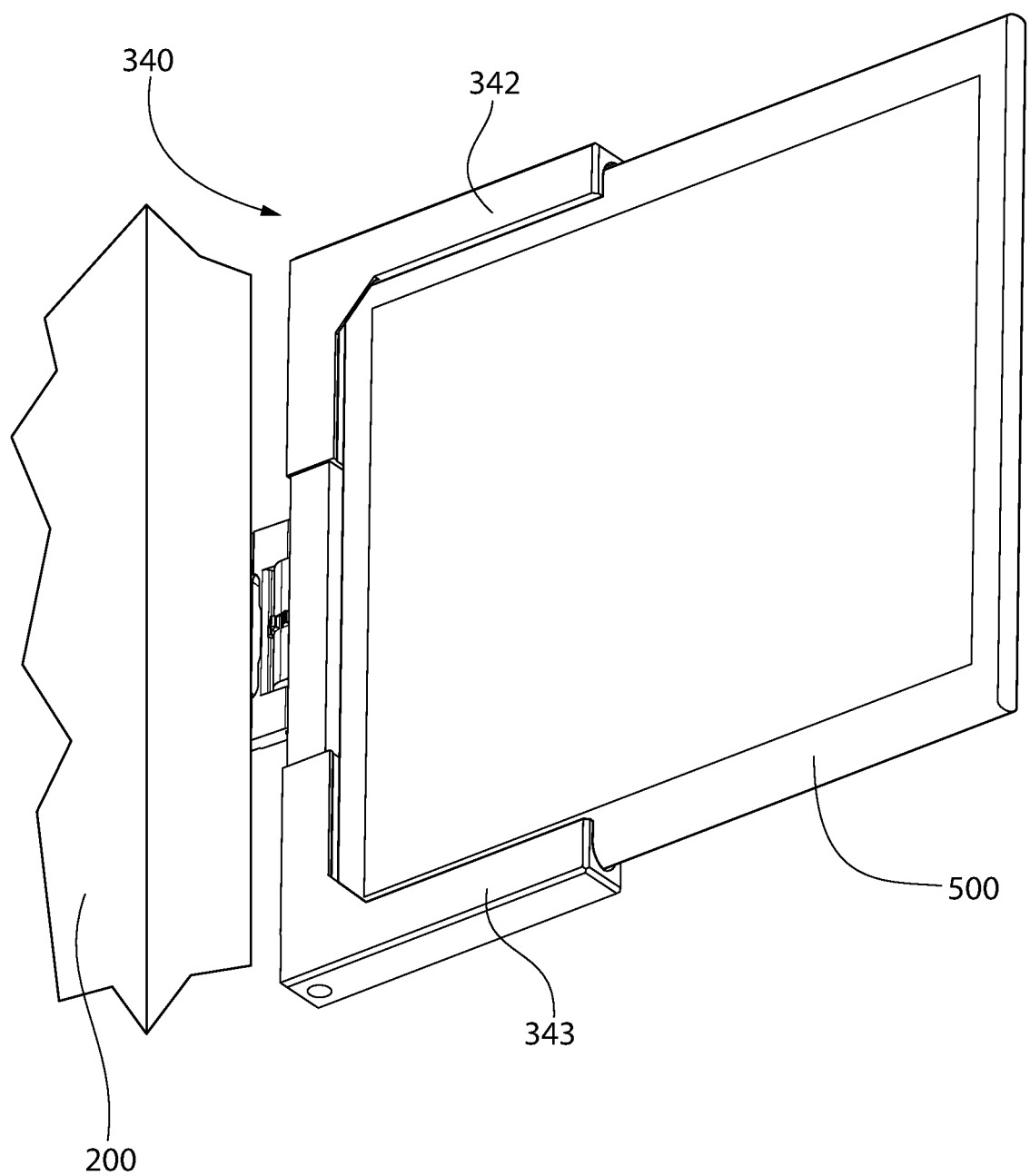

Referring to FIGS. 11A and 11B, the process of coupling an article 500 to the holding component 340 will be briefly described. As shown in FIG. 11A, the first and second clamp arms 342, 343 are pulled in a direction away from one another so that a sufficient space exists between them for insertion of the article 500. Once the article 500 is positioned between the first and second clamp arms 342, 343, a user may release the first and second clamp arms 342, 343 so that a spring can bias them into contact with the article 500 to securely hold the article 500. A user can pull the first and second clamp arms 342, 343 apart to remove the article 500 as desired. Of course, as noted above the use of springs is only one embodiment for the manner in which the first and second clamp arms 342, 343 securely hold the article 500. In other embodiments, various fasteners such as screws, bolts, or the like can be used to move the first and/or second clamp arms 342, 343 for purposes of holding the article 500. In still other embodiments, ratchets, depressible button/aperture interactions, or the like may be used to move the first and/or second clamp arms 342, 343 for purposes of holding the article 500. Thus, any techniques, components, structures, or the like may be used so long as one or both of the first and second clamp arms 342, 343 is movable relative to the other to insert the article 500 therebetween so that the first and second clamp arms 342, 343 can securely hold the article 500 for viewing by a user. While FIGS. 11A and 11B illustrate the article 500 being held in a landscape orientation, the article 500 could also be held in a portrait orientation.

In the exemplified embodiment, the article 500 is an electronic device such as a tablet. However, the invention is not to be so limited in all embodiments and the article 500 may be other types of electronic devices, such as ebooks, laptops, smart phones, or the like in other embodiments. In still other embodiments, the article 500 may be a book, a newspaper, a magazine, a notebook, a folder, or a frame. The article 500 can be any type of device or item that a user may desire to view while performing activities or routines in proximity to the cabinet assembly 10. As mentioned herein, the article 500 is detachably coupled to the holding component 500 and different articles can be held by the holding component 500 depending on user preference and need.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:
1. A cabinet apparatus comprising:
a cabinet assembly having a longitudinal axis and comprising:
a housing comprising a cavity having a front opening; and
a door coupled to the housing to close the front opening of the cavity; and
a support assembly coupled to the cabinet assembly and movable vertically relative to the cabinet assembly in opposing directions parallel to the longitudinal axis, the support assembly comprising a holding component configured to hold an article for viewing by a user, the holding component being rotatable relative to the cabinet assembly about a first rotational axis between: (1) a stowed position whereby the door is closed and the holding component is located inside the cavity of the housing; and (2) a deployed position whereby the door is closed and the holding component is located outside the cavity of the housing;
wherein the holding component is configured to hold the article in a detachable manner; and
wherein the holding component is a clamp comprising first and second clamp arms, at least one of the first and second clamp arms being movable relative to the other one of the first and second clamp arms so that the holding component can hold articles of varying size.

2. The cabinet apparatus according to claim 1 wherein the holding component is rotatable relative to the cabinet assembly about a second rotational axis that is spaced apart from the first rotational axis to adjust an angle at which the holding component protrudes from a periphery of the cabinet assembly when in the deployed position to modify a viewing angle of the article being held by the holding component as perceived by a user.

3. The cabinet apparatus according to claim 2 wherein the first and second rotational axes are parallel to the longitudinal axis of the cabinet.

4. The cabinet apparatus according to claim 2 wherein the support assembly comprises a mounting assembly that is slidably coupled to the cabinet assembly, a hinge plate that is pivotably coupled to the mounting assembly, and the holding component that is pivotably coupled to the hinge plate, and wherein the first rotational axis is formed at a connection between the hinge plate and the mounting assembly and the second rotational axis is formed at a connection between the hinge plate and the holding component.

5. The cabinet apparatus according to claim 2 wherein the support assembly comprises a locking feature for locking the holding component in any one of a plurality of viewing angles.

6. The cabinet apparatus according to claim 2 wherein the second rotational axis is located inside the cavity when the holding component is in the stowed position and the door is closed and outside the cavity when the holding component is in the deployed position and the door is closed.

7. The cabinet apparatus according to claim 2 wherein the support assembly is movable vertically along a vertical axis that is parallel to the longitudinal axis, the vertical axis lying in a reference plane that is perpendicular to the door, and wherein the first and second rotational axes are located on the same side of the reference plane when the holding component is in the stowed position and on opposite sides of the reference plane when the holding component is in the deployed position.

8. The cabinet apparatus according to claim 1 wherein the support assembly comprises:
a mounting assembly for mounting the support assembly to the cabinet;
the holding component; and
a linkage assembly that is pivotably coupled to the mounting assembly and to the holding component.

9. The cabinet apparatus according to claim 8 wherein the linkage assembly comprises a hinge pin and a hinge plate, the hinge plate comprising a first end having a first attachment portion and a second end having a second attachment portion, the hinge pin being coupled to the mounting assembly and to the first attachment portion of the hinge plate, and the holding component comprising an attachment member that is pivotably coupled to the second attachment portion of the hinge plate.

10. The cabinet apparatus according to claim 9 wherein the connection between the hinge pin and the hinge plate forms the first rotational axis and wherein the connection between the hinge pin and the mounting assembly forms a third rotational axis that is parallel to the first rotational axis, wherein the holding component comprises a base member, a first clamp arm coupled to the base member, and a second clamp arm coupled to the base member, at least one of the first and second clamp arms being movable relative to the base member to facilitate the coupling of the article to the holding component, wherein the attachment member of the holding component comprises a cylindrical element extending from the base member and a plurality of protuberances extending from an outer surface of the cylindrical element, the cylindrical element being pivotably coupled to the second attachment portion of the hinge plate and the plurality of protuberances interacting with an end surface of the hinge plate to lock the holding component in one of a plurality of different viewing angles relative to the housing component when the holding component is in the deployed position.

11. The cabinet apparatus according to claim 1 wherein the holding component is configured to hold the article in a detachable manner such that the article is completely separated from the holding component when the article is detached from the holding component.

12. The cabinet apparatus according to claim 1 wherein the support assembly moves vertically relative to the cabinet assembly by sliding the support assembly relative to the cabinet assembly while the support assembly remains coupled to the cabinet assembly.

13. The cabinet apparatus according to claim 1 wherein the holding component wraps at least partially around a peripheral edge of the article when the holding component holds the article.

14. A cabinet apparatus comprising:
a cabinet assembly having a longitudinal axis and comprising:
a housing comprising a cavity having a front opening; and
a door coupled to the housing to close the front opening of the cavity;
a support assembly coupled to the cabinet assembly, the support assembly comprising a holding component configured to hold an article for viewing by a user, the holding component being rotatable relative to the cabinet assembly about: (1) a first rotational axis to move the holding component between a stowed position whereby the holding component does not protrude from a periphery of the cabinet assembly and a deployed position whereby the holding component protrudes from the periphery of the cabinet assembly; and (2) a second rotational axis to adjust an angle at which the holding component protrudes from the periphery of the cabinet assembly when the holding component is in the deployed position;
wherein the first and second rotational axes are spaced apart from one another and parallel to the longitudinal axis of the cabinet assembly; and
wherein the holding component is configured to extend from the cabinet assembly at a plurality of different angles by rotating the holding component about the second rotational axis, and wherein the support assembly comprises a locking feature for locking the holding component in any of the plurality of different angles.

15. The cabinet apparatus according to claim 14 wherein the support assembly comprises a mounting assembly disposed within a track located on an inner surface of the door, the support assembly being movable upwardly and downwardly along a vertical axis that is parallel to the longitudinal axis of the cabinet assembly while remaining coupled to the cabinet assembly with the mounting assembly disposed within the track.

16. The cabinet apparatus according to claim 14 wherein the holding component comprises an attachment member that is rotatably coupled to a hinge plate for rotation of the holding component about the second rotational axis, the attachment member comprising a plurality of protuberances arranged in a spaced apart manner that selectively engage the hinge plate as the holding component rotates about the second rotational axis to form the locking feature.

17. The cabinet apparatus according to claim 14 wherein the holding component comprises a first clamp arm and a second clamp arm, at least one of the first and second clamp arms being movable relative to the other one of the first and second clamp arms so that the holding component can hold articles of varying size.

18. A cabinet apparatus comprising:
a cabinet assembly having a longitudinal axis: and
a support assembly comprising a holding component configured to detachably hold an electronic device for viewing by a user, the support assembly movably coupled to the cabinet assembly so that the support assembly can move relative to the cabinet assembly in accordance with a plurality of types of movement comprising: (1) upwardly and downwardly along a vertical axis that is parallel to the longitudinal axis of the cabinet assembly to adjust an elevation of the support assembly relative to the cabinet assembly; (2) rotationally about a first rotational axis that is parallel to the longitudinal axis of the cabinet assembly to move the holding component of the support assembly between a stowed position in which no portion of the support assembly protrudes from a periphery of the cabinet assembly and a deployed position in which the holding component protrudes from the periphery of the cabinet assembly; and (3) rotationally about a second rotational axis that is parallel to the longitudinal axis of the cabinet assembly to adjust an angle at which the holding component protrudes from the cabinet assembly when in the deployed position; and wherein the holding component comprises a first clamp arm and a second clamp arm that are spaced apart from one another by a modifiable distance to define a variable size holding region within which the electronic device is located when the electronic device is held by the holding component.

19. The cabinet apparatus according to claim 18 wherein the cabinet assembly comprises a housing having a cavity and a door that closes an open front end of the cavity when in a closed state, wherein in the deployed position the holding component and the second rotational axis are located outside of the cavity of the housing.

20. The cabinet apparatus according to claim 18 wherein the support assembly remains coupled to the cabinet assembly during movement of the support assembly in accordance with each of the plurality of types of movement.

\* \* \* \* \*